United States Patent
Teranishi et al.

(10) Patent No.: US 6,907,346 B2
(45) Date of Patent: Jun. 14, 2005

(54) GPS RECEIVER APPARATUS AND RECEIVING METHOD

(75) Inventors: Koichiro Teranishi, Kanagawa (JP); Katsuyuki Tanaka, Kanagawa (JP); Katsuya Hori, Kanagawa (JP)

(73) Assignee: Sony Corporation, Tokyo (JP)

( * ) Notice: Subject to any disclaimer, the term of this patent is extended or adjusted under 35 U.S.C. 154(b) by 17 days.

(21) Appl. No.: 10/475,740

(22) PCT Filed: Feb. 21, 2003

(86) PCT No.: PCT/JP03/01924

§ 371 (c)(1),
(2), (4) Date: Oct. 23, 2003

(87) PCT Pub. No.: WO03/071302

PCT Pub. Date: Aug. 28, 2003

(65) Prior Publication Data

US 2004/0138811 A1 Jul. 15, 2004

(30) Foreign Application Priority Data

Feb. 25, 2002 (JP) ........................................ 2002-047505

(51) Int. Cl.[7] .............................................. G01C 21/26
(52) U.S. Cl. ........................ 701/213; 701/214; 701/215; 701/300; 342/357.06; 342/357.12
(58) Field of Search ................................ 701/207, 213, 701/214, 215, 300; 342/357.01, 357.06, 357.08, 357.09, 357.12; 375/149

(56) References Cited

U.S. PATENT DOCUMENTS

| | | | | |
|---|---|---|---|---|
| 5,999,561 A | | 12/1999 | Naden et al. | 375/142 |
| 6,480,557 B1 | * | 11/2002 | Rog et al. | 375/349 |
| 2002/0149515 A1 | * | 10/2002 | Alanen et al. | 342/357.1 |
| 2003/0161543 A1 | * | 8/2003 | Tanaka | 382/250 |
| 2003/0219082 A1 | * | 11/2003 | Tanaka et al. | 375/324 |

FOREIGN PATENT DOCUMENTS

| | | |
|---|---|---|
| JP | 10-73649 | 3/1998 |
| JP | 2001-42023 | 2/2001 |

* cited by examiner

*Primary Examiner*—Gertrude A. Jeanglaude
(74) *Attorney, Agent, or Firm*—Frommer Lawrence & Haug LLP; William S. Frommer

(57) ABSTRACT

A GPS receiver can periodically obtain range data without degrading the performance such as positioning sensitivity and positioning speed and conserve energy consumption. Supplied with IF data from a frequency conversion section 4, a synchronization hold section (6) acquires synchronization of a carrier frequency and phase synchronization of a C/A code, holds the acquired state, and obtains necessary information such as range data. When range data is obtained, a switch (23) is turned off to stop supplying the power to the synchronization hold section (6). A control section (7) executes a positioning operation using the obtained range data and the like, finds and outputs positioning information indicative of a current position. Thereafter, the switch (23) is turned on to restart the synchronization hold section (6). In this manner, control is provided to repeatedly start and stop the synchronization hold section (6).

14 Claims, 22 Drawing Sheets

F I G. 2
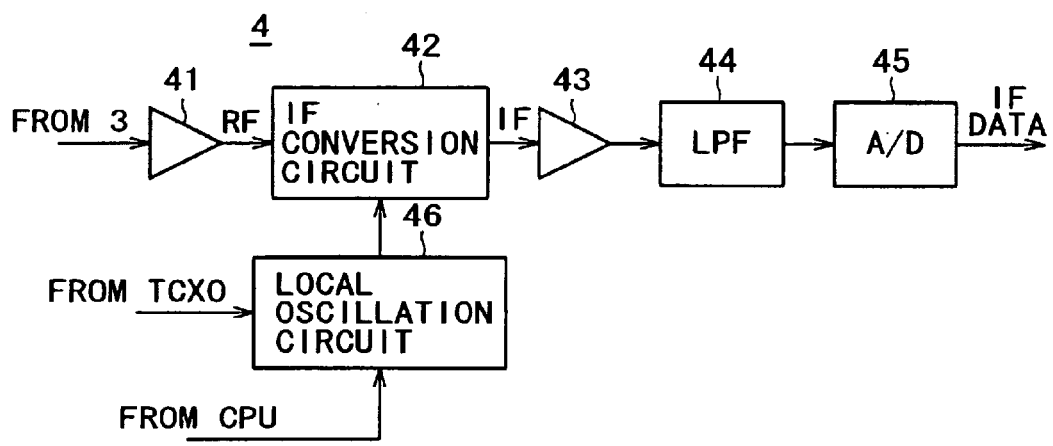
F I G. 3
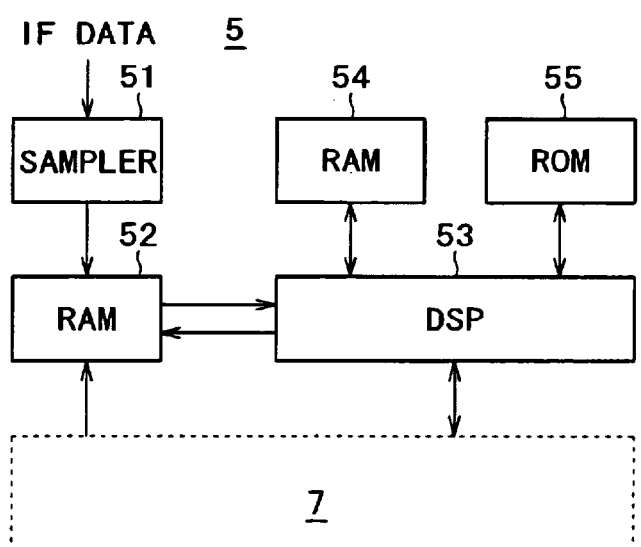

FIG. 27

[EQUATION (1)]

$$F[r(n) * c(n)] \Longleftrightarrow F(k) = R(k)C(k)$$

[EQUATION (2)]

$$F(k) = R(k)\overline{C}(k) \quad \text{(WHERE SYMBOL}^- \text{REPRESENTS THE COMPLEX CONJUGATE)}$$

[EQUATION (3)]

$$r(n) = A \cdot d(n) \cdot c(n) \cdot \cos 2\pi n \cdot f_o + n(n)$$

[EQUATION (4)]

$$F[r(n) \cdot \exp(j2\pi n f_o + \phi_o)] = \exp(j\phi_o) R(k - k_o)$$

[EQUATION (5)]

$$F'(k) = R(k - k_o)\overline{C}(k)$$

[EQUATION (6)]

$$|f'(n)| = \sqrt{f_R'(n)^2 + f_I'(n)^2}$$

[EQUATION (7)]

$$\phi = \tan^{-1}(f_I'(n) / f_R'(n))$$

[EQUATION (8)]

$$F'(k) = R(kM - k')\overline{C}(k) = R(kM - k_o)\overline{C}(k)$$

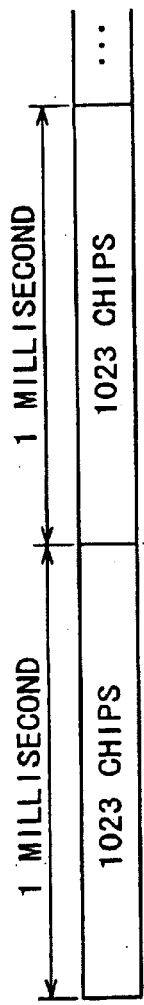
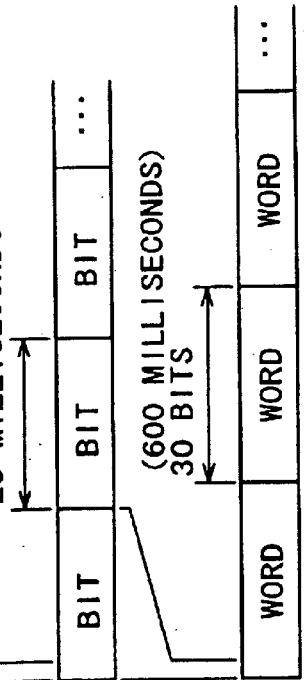
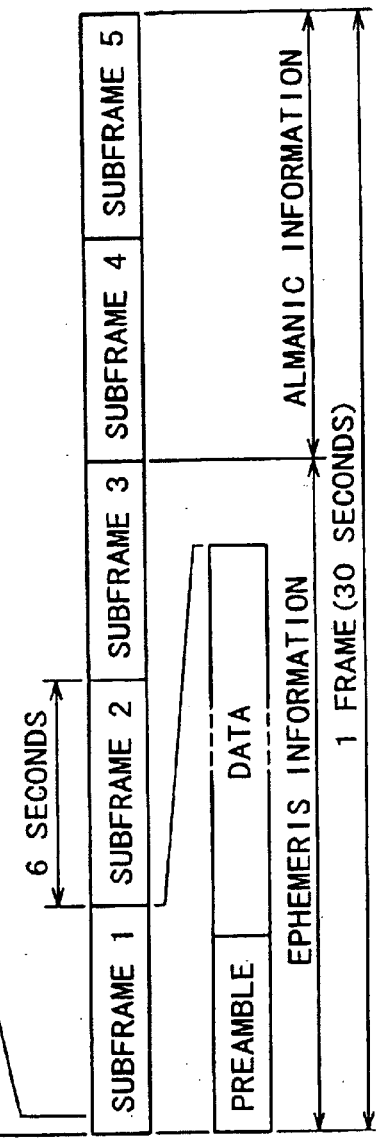
FIG. 28A (PRIOR ART)
FIG. 28B (PRIOR ART)
FIG. 28C (PRIOR ART)
FIG. 28D (PRIOR ART)
FIG. 28E (PRIOR ART)

GPS RECEIVER APPARATUS AND RECEIVING METHOD

TECHNICAL FIELD

The present invention relates to a GPS (Global Positioning System) receiver and a GPS signal reception method used for portable navigation systems and navigation systems of movable bodies such as cars, aircraft, and watercraft.

BACKGROUND ART

In a GPS system that uses an artificial satellite (GPS satellite) to measure positions of movable bodies, a GPS receiver has a basic function of receiving signals from four or more GPS satellites, computing a receiver's position from received signals, and notifying a user of the receiver's position.

The GPS receiver demodulates a signal from the GPS satellite to obtain the GPS satellite's orbital data. The GPS receiver then derives the receiver's three-dimensional position using simultaneous equations from the GPS satellite's orbit and time information and the received signal's delay time. There are needed four GPS satellites to obtain received signals because an error occurs between the GPS receiver's inside time and the satellite time and it is necessary to remove an effect of the error.

A household GPS receiver receives a spectrum spread signal wave called an L1-band, C/A (Clear and Acquisition) code from the GPS satellite for positioning operations.

The C/A code is a PN (Pseudorandom Noise) sequence code, e.g., a Gold code having a transmission signal rate (chip rate) of 1.023 MHz and a code length of 1023. The C/A code is a BPSK (Binary Phase Shift Keying) modulated signal made of a carrier wave (hereafter referred to as a carrier) having a frequency of 1575.42 MHz by means of a signal spread from 50 bps data. Since the code length is 1023 in this case, the C/A code comprises a repetition of PN sequence codes at a cycle of 1023 chips (i.e., one cycle=one millisecond) as shown in FIG. 28(A).

A PN sequence code of the C/A code is unique to each GPS satellite. The GPS receiver is previously configured to be able to detect which GPS satellite uses which PN sequence code. A navigation message (to be described) is used to indicate from which GPS satellite the GPS receiver can receive signals at a given point and time. During three-dimensional positioning, for example, the GPS receiver receives radio waves available at the point and time from four or more GPS satellites applies an inverse spectrum spread to the radio waves, and performs a positioning operation to find its own position.

As shown in FIG. 28(B), one bit of satellite signal data is transmitted as 20 cycles of PN sequence code, i.e., in units of 20 milliseconds. That is to say, the data transmission rate is 50 bps. The bit set to "1" or "0" inverts one cycle of PN sequence code, i.e., 1023 chips.

As shown in FIG. 28(C), the GPS forms one word in units of 30 bits (600 milliseconds). As shown in FIG. 28(D), one subframe (6 seconds) comprises 10 words. As shown in FIG. 28(E), the first word in a subframe is always prefixed by a preamble as a specified bit pattern even if data is updated. Data is transmitted after the preamble.

One frame (30 seconds) comprises five subframes. A navigation message is transmitted in units of one-frame data. First three subframes in one-frame data constitute satellite-specific information called ephemeris information. This information contains a parameter to find the satellite's orbit and the time to transmit the signal from the satellite.

All GPS satellites have atomic clocks so that each GPS satellite can use the common time information under surveillance of an earth station. The ephemeris in a navigation message from the GPS satellite contains data representing the time, i.e., week number and TOW (time of week).

The week number is 10-bit data representing 0 through 1023 and is incremented every week starting from Jan. 6 (Sunday) in 1980 to be the zeroth week. The TOW is 17-bit data representing 0 through 100800 (=3600×24×7/6) and is incremented every 6 seconds starting from 0:00 a.m. on Sunday.

The GPS receiver can find an absolute time by obtaining the week number and the TOW from the received navigation data. A value smaller than 6 seconds can synchronize with the GPS satellite time in accordance with accuracy of a reference oscillator of the GPS receiver during a process in which the GPS receiver locks on to a signal from the GPS satellite. The PN sequence code of the GPS satellite is generated as synchronized with the atomic clock.

The orbit information in the ephemeris information is updated at an interval of several hours and remains unchanged until updated. The orbit information in the ephemeris information can be stored in the GPS receiver's memory so as to be able to accurately reuse the same information for several hours.

The remaining two subframes in one frame of navigation message constitute so-called almanac information that is commonly transmitted from all satellites. The almanac information requires 25 frames for obtaining the entire information and comprises information about approximate positions of the GPS satellites, information indicative of available GPS satellites, and the like.

The almanac information is updated at least once in six days and remains unchanged until updated. The almanac information takes effect for several months if it is used for the purpose of finding approximate positions of GPS satellites. However, it is desirable for the GPS receiver to appropriately update the almanac information and keep the most recent data.

First, a carrier needs to be removed in order to receive a signal from the GPS satellite and obtain the above-mentioned data. The signal from the GPS satellite is subject to phase synchronization with the C/A code through the use of a PN sequence code (hereafter referred to as a PN code) that is provided in the GPS receiver and is equivalent to the C/A code used for the GPS satellite to be received. In this manner, the signal from the GPS satellite is acquired. Then, an inverse spectrum spread is performed. Bits are detected after the phase synchronization with the C/A code is successful and the inverse spread is performed. It becomes possible to obtain a navigation message containing the time information and the like from the GPS satellite signal.

Signals are acquired from the GPS satellite by means of phase synchronization retrieval for the C/A code. The phase synchronization retrieval detects correlation between the GPS receiver's PN code and the PN code in the signal from the GPS satellite. Both are assumed to be synchronized with each other when the correlation detection result provides a correlation value that is greater than a predetermined value, for example. When both are not assumed to be synchronized with each other, some synchronization technique is used to control the GPS receiver's PN code phase for synchronization with the PN code of the signal from the GPS satellite.

As mentioned above, the signal from the GPS satellite (GPS signal) contains a BPSK-modulated carrier by means of a signal whose data is spread by the PN code (spread code). In order for the GPS receiver to receive the GPS signal, it is necessary to establish synchronization with not only the spread code, but also the carrier and the data. However, it is impossible to establish synchronization with the spread code and the carrier independently.

It is a general practice that the GPS receiver converts the GPS signal's carrier frequency into an intermediate frequency within several megahertz and performs the above-mentioned synchronization detection process using the intermediate frequency signal. A carrier in the intermediate frequency signal contains: a frequency error due to a Doppler shift mainly in accordance with a movement speed of the GPS satellite; and a local oscillator's frequency error generated in the GPS receiver when the GPS signal is converted into the intermediate frequency signal.

Due to these frequency error factors, the intermediate frequency signal contains an unknown carrier frequency. It is necessary to search for the frequency. A synchronization point (synchronization phase) within one cycle of PN code depends on positional relationship between the GPS receiver and the GPS satellite and is therefore unknown. Accordingly, some synchronization technique is needed as mentioned above.

A conventional GPS receiver uses the synchronization technique using a frequency search for the carrier, a sliding correlator, a DLL (Delay Locked Loop), and a Costas loop. This will be further described below.

A clock to drive a generator for the GPS receiver's PN code is generally available by dividing a reference frequency oscillator provided for the GPS receiver. A highly accurate quartz oscillator is used for the reference frequency oscillator. An output from the reference frequency oscillator is used to generate a local oscillation signal for converting a received signal from the GPS satellite into an intermediate frequency signal.

FIG. 29 diagrams the frequency search. The frequency search assumes frequency f1 for a clock signal to drive the generator for the GPS receiver's PN code. The frequency search sequentially shifts the phase synchronization retrieval for the PN code, i.e., the PN code phase by the amount of one chip at a time. The frequency search detects correlation between the GPS received signal and the PN code at the corresponding chip phase. The frequency search detects a peak value for the correlation to detect a phase for establishing the synchronization.

When the clock signal has frequency 1, there may not be available synchronizing phase in all phase retrievals for 1023 chips. In such case, the frequency search changes a division ratio for the reference frequency oscillator, changes the drive clock signal's frequency to frequency f2, and performs a phase retrieval for 1023 chips. This operation is repeated by stepwise changing the frequency of the drive clock signal as shown in FIG. 29. The frequency search operates as mentioned above.

When the frequency search detects a synchronizable frequency of the drive clock signal, the detected clock frequency is used to perform the final PN code phase synchronization. This enables acquisition of satellite signals despite oscillation frequency deviation in the quartz frequency oscillator.

When signals are continuously received from the GPS satellite for positioning according to a conventional manner, the synchronization for the carrier and the PN code is acquired and the acquired synchronization is held. For this reason, it is necessary to continuously operate circuits in the GPS receiver, especially circuits for the DLL and the Costas loop.

Further, the positioning operation requires a distance (range) between a receiver P and a GPS satellite ST1 or ST2 as shown in FIG. 30. The range can be sufficiently obtained at a specified cycle such as every 0.5, 1, or 2 seconds, for example. Normally, the range is measured at a relatively short interval such as 0.1 seconds (100 milliseconds) as shown in FIG. 31, for example, so as to always accurately obtain the range.

Consequently, the GPS receiver is always in full operation, increasing power consumption for the GPS receiver. The GPS receiver is mounted on a movable body or is carried by a user for operation. It is important to accurately operate the GPS receiver using the power from a battery for as long a time as possible.

In order to decrease power consumption of the GPS receiver, an intermittent operation is considered to repeatedly turn on or off the GPS receiver.

However, intermittently operating the GPS receiver may sacrifice the GPS receiver performance such as positioning sensitivity or positioning speed compared to the state of always activating the power. That is to say, intermittently operating the GPS receiver may disable accurate positioning, detect just an approximate position of the GPS receiver, or consume time to detect an accurate position.

The above-mentioned problems become particularly serious when a user manually performs an intermittent operation or when an intermittent operation is performed at a cycle that gives no consideration to an acquisition cycle of range data or an output cycle of positioning information indicative of the GPS receiver's current position.

The present invention has been made in consideration of the foregoing. It is therefore an object of the present invention to provide a GPS receiver and a GPS signal reception method capable of periodically obtaining data within a range needed for range computation range data without degrading the performance such as positioning sensitivity and positioning speed and conserving energy consumption.

DISCLOSURE OF THE INVENTION

In order to solve the above-mentioned problems, a GPS receiver according to the present invention (1) comprises:

a frequency conversion means for converting a high-frequency GPS signal into an intermediate frequency GPS signal, wherein the high-frequency GPS signal is transmitted as transmission data from an artificial satellite by modulating a carrier wave through a signal spectrum-spread by a spread code;

a synchronization hold means for obtaining the transmission data by receiving the intermediate frequency GPS signal supplied from the frequency conversion means and acquiring and holding synchronization of the carrier wave and phase synchronization of the spread code;

a control means for controlling repetition of an intermittent operation which operates the synchronization hold means to obtain the transmission data, then stops operating the synchronization hold means, and again operates the synchronization hold means after lapse of a specified time by using, as initial values, a carrier wave frequency and a spread code phase valid for the most recent stop condition; and a positioning operation means for performing a positioning operation by using the transmission data obtained through the synchronization hold means and finding and outputting positioning information indicative of a current position.

The GPS receiver according to the present invention (1) uses the frequency conversion means to down-convert a high-frequency GPS signal from an artificial satellite into an intermediate frequency GPS signal which is then supplied to the synchronization hold means. The synchronization hold means acquires and holds synchronization of a carrier in the intermediate frequency GPS signal from the frequency conversion means and phase synchronization of the spread code, and makes it possible to obtain transmission data from the artificial satellite.

After the transmission data is obtained via the synchronization hold means, the control means provides control to stop the synchronization hold means. The obtained transmission data is used to perform a positioning operation for finding positioning information indicative of the current position. The positioning information is output at a specified cycle.

When the positioning information is output, i.e., a specified time elapses after the synchronization hold means stops, the synchronization hold means restarts its operation using, as initial values, the carrier wave frequency and the spread code phase valid for the most recent stop condition. The intermittent operation takes place in such a manner that the synchronization hold means starts and stops repeatedly.

The synchronization hold means can be used to accurately obtain transmission data at a specified cycle. After obtaining the transmission data, the synchronization hold means can stop until the timing to obtain the next transmission data. Accordingly, the power consumption can be saved. Further, the range data can be obtained at a specified cycle to compute the range.

A GPS receiver according to the present invention (2) conforms to the GPS receiver according to the present invention (1), wherein the control means is configured to be able to change an operating time of the synchronization hold means in accordance with an output cycle of the positioning information.

The GPS receiver according to the present invention (2) gives consideration to the following. When the GPS receiver executes an intermittent operation, increasing an output cycle for positioning information also increases the stop time for the synchronization hold means. A carrier wave frequency and a spread code phase valid for the most recent stop condition greatly differ from actual values, requiring a long time for incorporating the synchronization. By contrast, decreasing an output cycle for positioning information also decreases the stop time. The carrier wave frequency and the spread code phase valid for the most recent stop condition hardly differ from actual values, requiring a short time for incorporating the synchronization.

In consideration for this, the control means provides control to adjust the synchronization hold means so as to change its operating time in accordance with an output cycle of positioning data. It is possible to obtain transmission data accurately and as fast as possible. After obtaining the transmission data in this case, the synchronization hold means is configured to stop until the next timing to obtain transmission data. It is possible to periodically obtain transmission data and reduce the GPS receiver's power consumption.

A GPS receiver according to the present invention (3) conforms to the GPS receiver according to the present invention (2) and comprises:

an initial value estimation means for estimating the carrier wave frequency and the spread code phase used as the initial values based on the already obtained transmission data, wherein the control means can control the synchronization hold means by using the carrier wave frequency and the spread code phase as the initial values estimated in the initial value estimation means.

The GPS receiver according to the present invention (3) gives consideration to the case where the positioning information is subject to a long output cycle or a movable body mounting the GPS receiver causes large acceleration. In such case, a large error may cause long time to acquire and hold the synchronization even if the synchronization hold means restarts by using the carrier wave frequency and the spread code phase valid for the stop condition of the synchronization hold means.

To solve this problem, the initial value estimation means estimates the carrier wave frequency and the spread code phase at the time of restarting the synchronization hold means based on the already obtained transmission data from the artificial satellite. The control means controls the synchronization hold means using the carrier wave frequency and the spread code phase estimated by the initial value estimation means.

According to this feature, if the positioning information is subject to a long output cycle or a movable body mounting the GPS receiver causes large acceleration, the synchronization hold means can operate using the carrier wave frequency and the spread code phase estimated by the initial value estimation means. After the synchronization hold means restarts operating, there is no need for long time to acquire and hold the carrier synchronization and the spread code phase synchronization. It is possible to accurately and fast acquire and hold the synchronization for obtaining transmission data.

A GPS receiver according to the present invention (4) conforms to the GPS receiver according to the present invention (1) and comprises:

an initial value estimation means for estimating the carrier wave frequency and the spread code phase used as the initial values in accordance with an output cycle of the positioning information by using the already obtained transmission data; and an operating time estimation means for estimating an operating time for the synchronization hold means in accordance with an output cycle of the positioning information, wherein the control means controls the synchronization hold means based on the carrier wave frequency and the spread code phase estimated in the initial value estimation means and based on the estimated operating time estimated in the operating time estimation means.

The GPS receiver according to the present invention (4) gives consideration to the following. When the GPS receiver executes an intermittent operation, increasing an output cycle for positioning information also increases the stop time for the synchronization hold means. A carrier wave frequency and a spread code phase valid for the most recent stop condition greatly differ from actual values, requiring a long time for establishing the carrier synchronization and the spread code phase synchronization.

In this case, the initial value estimation means estimates the carrier wave frequency and the spread code phase to be used as initial values for the synchronization hold means. The operating time estimation means estimates the operating time for the synchronization hold means. The control means controls the synchronization hold means based on the estimated carrier wave frequency and spread code phase and the estimated operating time. In this manner, it is possible to obtain transmission data from the artificial satellite without degrading the positioning sensitivity and speed.

A GPS receiver according to the present invention (5) conforms to the GPS receiver according to the present invention (1), wherein the control means controls start and stop conditions of the frequency conversion means in synchronization with stop conditions of the synchronization hold means.

The GPS receiver according to the present invention (5) need not receive a signal from the artificial satellite and down-convert it while the synchronization hold means is inactive. The control means provides control to intermittently operate the frequency conversion means in synchronization with start and stop conditions of the synchronization hold means. In this manner, it is possible to save the power consumption of the frequency conversion means in addition to the synchronization hold means.

A GPS receiver according to the present invention (6) conforms to the GPS receiver according to the present invention (1), wherein the synchronization hold means comprises a Costas loop section to acquire and hold synchronization of the carrier wave and a delay lock loop section to acquire and hold phase synchronization of the spread code The GPS receiver according to the present invention (6) uses the synchronization hold means comprising the Costas loop section and the delay lock loop section that are conventionally configured to operated continuously. The present invention (6) configures the Costas loop section and the delay lock loop section to operate intermittently.

This can efficiently save the power consumption. Further, the positioning sensitivity and speed can be protected against degradation by estimating the operating time or initial values used for the Costas loop and the delay lock loop section and using an estimation result to control the Costas loop and the delay lock loop section.

A GPS receiver according to the present invention (7) conforms to the GPS receiver according to the present invention (1) and comprises:

a synchronization acquisition means for fast acquiring synchronization of the carrier wave and phase synchronization of the spread code and outputting the acquired carrier wave frequency and spread code phase, wherein the control means provides controls so as to operate the synchronization hold means at least after a power-on sequence by using, as the initial values, the carrier wave frequency and the spread code phase from the synchronization acquisition means, operate the synchronization hold means, and then repeatedly start and stop the synchronization acquisition means at a cycle longer than or equal to that for the synchronization hold means.

The GPS receiver according to the present invention (7) provides the synchronization acquisition means capable of fast acquiring synchronization of a carrier in the intermediate frequency GPS signal and phase synchronization of a spread code through the use of a technique such as FFT (Fast Fourier Transform), for example. The control means controls the synchronization hold means using the carrier wave frequency and the spread code phase acquired by the synchronization acquisition means.

The control means controls the synchronization hold means to operate intermittently. The control means also controls the synchronization acquisition means to operate intermittently. The synchronization acquisition means is controlled to start and stop at a cycle longer than or equal to that for the synchronization hold means.

This can further improve the positioning accuracy and speed. Intermittent operations of the synchronization hold means and the synchronization acquisition means can decrease the power consumption.

BRIEF DESCRIPTION OF DRAWINGS

FIG. 2 is a block diagram showing an example of a frequency conversion section in the GPS receiver shown in FIG. 1;

FIG. 3 is a block diagram showing an example of a synchronization acquisition section in the GPS receiver shown in FIG. 1;

FIG. 27 shows equations used for the embodiment of the present invention;

FIGS. 28A to 28E show a configuration of a signal from a GPS satellite;

BEST MODE FOR CARRYING OUT THE INVENTION

Referring now to the accompanying drawings, the following describes an embodiment of the GPS receiver and the reception method according to the present invention.

Figure 1:
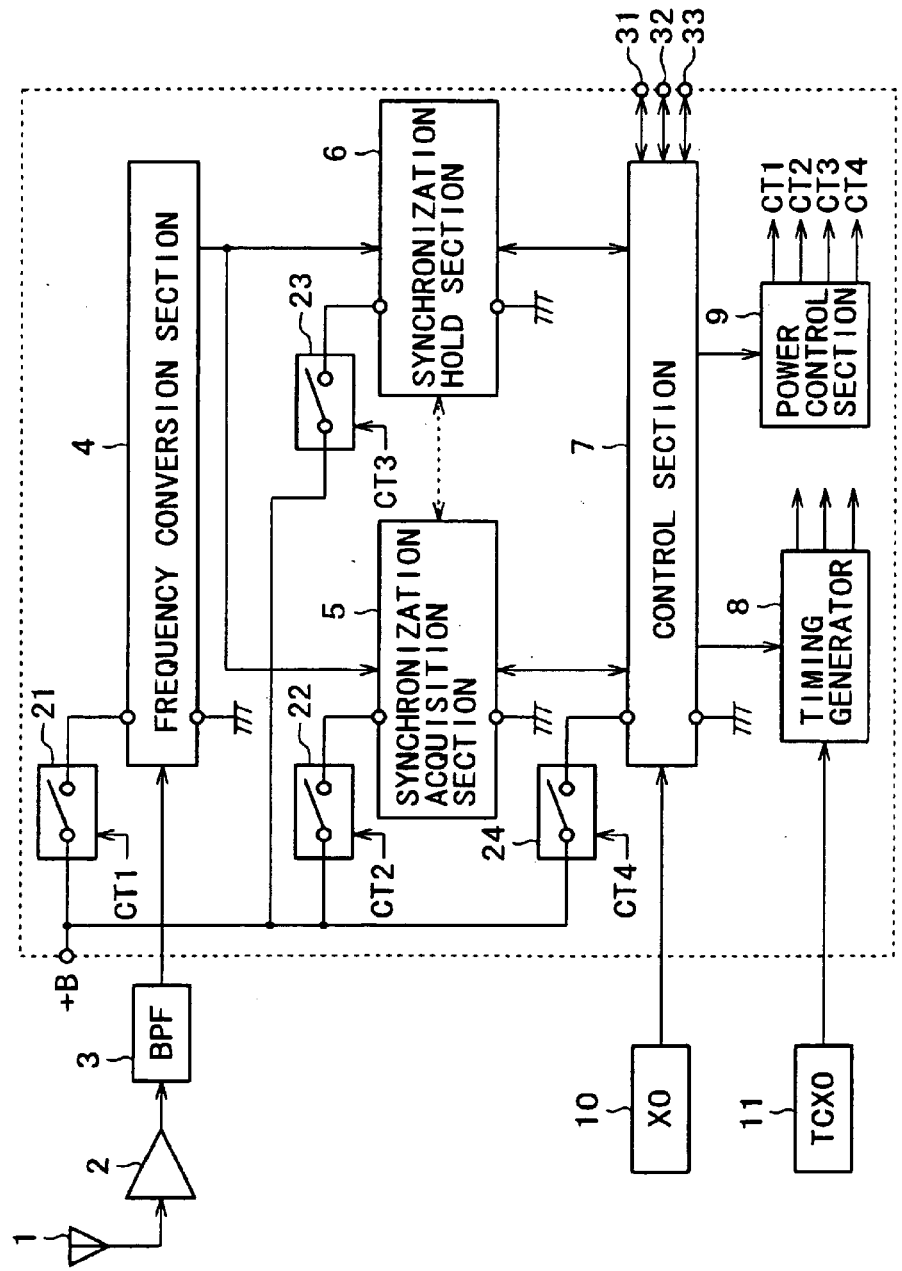
FIG. 1 is a block diagram showing an embodiment of a GPS receiver according to the present invention.

FIG. 1 is a block diagram showing a GPS receiver according to the embodiment to which the GPS receiver and the reception method according to the present invention are applied. As shown in FIG. 1, the GPS receiver according to the embodiment comprises an antenna 1; an amplifier 2; a BPF (Band Pass Filter) 3; a frequency conversion section 4; a synchronization acquisition section 5; a synchronization hold section 6; a control section 7; a timing generator 8 to generate a clock signal supplied to each part; a power supply control section 9; a crystal oscillator (designated as XO in FIG. 1) 10; and a temperature compensated crystal oscillator (hereafter referred to as TCXO) 11.

Further, as shown in FIG. 1, the GPS receiver according to the embodiment is provided with power on/off switches 21, 22, 23, and 24. The switch 21 turns on or off the power supplied to the frequency conversion section 4. The switch 22 turns on or off the power supplied to the synchronization acquisition section 5. The switch 23 turns on or off the power supplied to the synchronization hold section 6. The switch 24 turns on or off the power supplied to the control section 7.

The control section 7 controls the power supply control section 9. The power supply control section 9 supplies switch control signals CT1, CT2, CT3, and CT4 which respectively control the switches 21, 22, 23, and 24 for switching. That is to say, the power on/off control is available for each of the frequency conversion section 4, the synchronization acquisition section 5, the synchronization hold section 6, and the control section 7, independently.

The power supply control section 9 and the switches 21, 22, 23, and 24 implement intermittent operations for the respective circuits, saving the power consumption without degrading the positioning sensitivity or speed. In FIG. 1, an area enclosed in a dotted line corresponds to one IC (integrated circuit).

First, the following describes the configuration and operations of the GPS receiver according to the embodiment before describing an intermittent operation of the GPS receiver according to the embodiment. A high-frequency GPS signal is received at the antenna 1 from a GPS satellite and is supplied to the amplifier 2.

As mentioned above, the high-frequency GPS signal is transmitted from each GPS satellite. This signal is formed by BPSK modulating a carrier having a frequency of 1575.42 MHz from 50 bps transmission data using a spectrum spread signal (C/A code) according to a PN code (spread code) having a transmission signal rate of 1.023 MHz and a code length of 1023 and having a pattern determined for each GPS satellite.

The amplifier 2 amplifies the supplied high-frequency GPS signal to a specified level and supplies it to the BPF 3. The BPF 3 removes unnecessary components from the supplied high-frequency GPS signal and supplies the frequency conversion section 4 with the high-frequency GPS signal void of unnecessary components.

[About the Frequency Conversion Section]

The frequency conversion section 4 down-converts the supplied high-frequency GPS signal into an intermediate frequency GPS signal, i.e., an intermediate frequency signal, and analog-digital converts this signal to generate intermediate frequency data (hereafter referred to as IF data). The frequency conversion section 4 then supplies this IF data to the synchronization acquisition section 5 and the synchronization hold section 6.

FIG. 2 diagrams a configuration example of the frequency conversion section 4. As shown in FIG. 2, the frequency conversion section 4 comprises an amplifier 41; an intermediate frequency conversion circuit (hereafter referred to as an IF conversion circuit) 42; an amplifier 43; an LPF (LowPass Filter) 44; an analog/digital converter (hereafter referred to as an A/D converter) 45; and a local oscillation circuit 46 configured to be a frequency synthesizer.

A 1575.42 MHz high-frequency GPS signal is supplied from the BPF 3 to the IF conversion circuit 42 via the amplifier 41. An output from the TCXO 11 is supplied to the local oscillation circuit 46, thus providing an local oscillation output with the fixed output frequency and frequency ratio from the TCXO 11.

The local oscillation output from the local oscillation circuit 46 is supplied to the IF conversion circuit 42. The 1575.42 MHz high-frequency GPS signal (RF) is converted into a lower 1.023 MHz intermediate frequency GPS signal (IF). The intermediate frequency GPS signal is amplified in the amplifier 43, is band-limited in the LPF 44, and then is supplied to the A/D converter 45. The A/D converter 45 converts the supplied intermediate frequency GPS signal into a digital signal to generate IF data and supplies it to the synchronization acquisition section 5 and the synchronization hold section 6.

[About the Synchronization Acquisition Section]

The synchronization acquisition section 5 stores the supplied IF data for a specified period and executes a process to fast acquire the carrier frequency synchronization and the C/A code phase synchronization for the IF data. The synchronization acquisition section 5 detects a C/A code phase, a carrier frequency, a correlation peak level, and a satellite number and supplies these data to the control section 7.

FIG. 3 is a block diagram showing a configuration example of the synchronization acquisition section 5. As shown in FIG. 3, the synchronization acquisition section 5 comprises a sampler 51, RAM (Random Access Memory) 52, DSP (Digital Signal Processer) 53, RAM 54, and ROM (Read Only Memory) 55.

The IF data from the frequency conversion section 4 is supplied to the sampler 51. The sampler 51 samples the supplied IF data using a signal having a specified frequency and writes the sampled IF data to the RAM 52 to store the specified amount of IF data in the RAM 52.

The RAM 54 is mainly used as a work area for processes in the DSP 53. The ROM 55 stores programs executed in the DSP 53 and data needed for processes.

The DSP 53 performs a synchronization acquisition process using the FFT (Fast Fourier Transform) for the IF data stored in the RAM 52 and the PN code generated from the local apparatus to detect the C/A code phase, the carrier frequency, and the correlation peak level as mentioned above.

[Specific Configuration and Operations of the Synchronization Acquisition Section]

Figure 4:
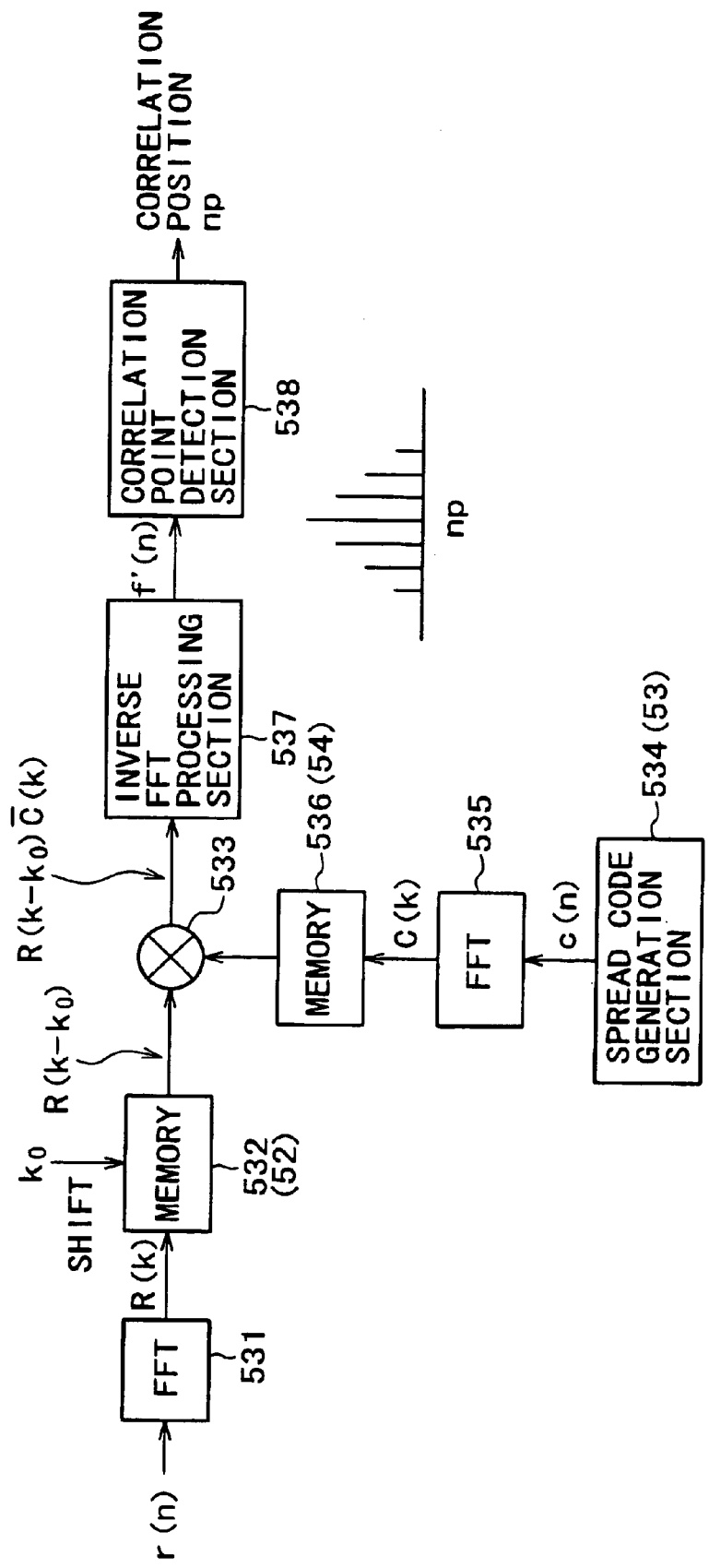
FIG. 4 is a block diagram showing a function of a DSP in the synchronization acquisition section shown in FIG. 1 and a synchronization acquisition process performed in the DSP.

FIG. 4 is a block diagram showing specific operations of the DSP 53. The DSP 53 has functions of a spread code generation section 534, FFT processing sections 531 and 535, a multiplication section 533, a inverse FFT processing section 537, and a correlation point detection section 538 and is configured to be a so-called digital matched filter.

The IF data (received signal) is written to the RAM 52 of the synchronization acquisition section 5 and is read for every cycle (1023 chips) of the C/A code. The FFT processing section 531 applies an FFT process to the read signal. The FFT result is written to the memory 532. For example, an unused area of the RAM 52 is used as the memory 532 as indicated by parentheses in FIG. 4. After being written to the memory 532, the FFT result of the IF data is read with its read position controlled and is supplied to the multiplication section 533 as will be discussed in more detail below.

According to the embodiment, the DSP 53 generates a PN code having a specified pattern, e.g., based on information stored in the ROM 55. At this time, the PN code to be generated corresponds to one cycle (1023 chips) having the same sequence as that for the PN code used for a signal from the GPS satellite to be processed in the DSP 53.

The one-cycle PN code to be generated in the DSP 53 is supplied to the FFT processing section 535 for FFT processing. The result is written to the memory 536. For example, RAM 54 is used for the memory 536 as indicated by parentheses in FIG. 4. Like in an ordinary case, FFT results are read from the memory 536 in the ascending order of frequencies and are supplied to the multiplication section 533.

The multiplication section 533 multiplies an FFT result of the IF data as a received signal from the memory 532 and an FFT result of the PN code from the memory 536 together to compute a degree of correlation between the IF data and the PN code in a frequency area. Here, the multiplication section 533 multiplies a complex conjugate of either the discrete Fourier transform of the received signal or the discrete Fourier transform of the spread code by the other. The multiplication result is supplied to the inverse FFT processing section 537. The signal in the frequency area is returned to a signal in the time area.

An inverse FFT result obtained from the inverse FFT processing section 537 is equivalent to a correlation detection signal between the IF data and the PN code in the time area. This correlation detection signal is supplied to the correlation point detection section 538. The correlation point detection section 538 determines whether or not the IF data and the PN code are synchronized. If it is determined that they are synchronized, the correlation point detection section 538 detects the phase of a peak value for the correlation detection signal as a correlation point.

Figure 5:
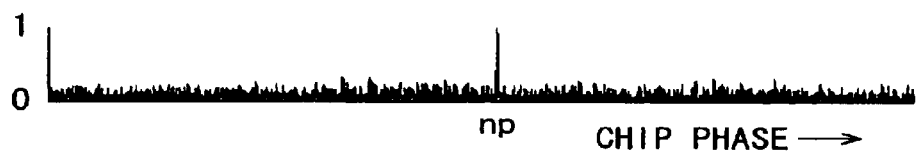
FIG. 5 shows an example of a spectrum for correlation detection output.

The correlation detection signal indicates a correlation value in each chip phase for one cycle of the spread code. There may be the case where the spread code in the IF data synchronizes with the spread code (PN code) from the spread code generation section 534. In this case, as shown in FIG. 5, there is obtained a correlation waveform in which the correlation for one of 1023 chip phases indicates a peak value exceeding a predetermined threshold value. The chip phase for this peak value becomes a correlation point phase.

On the other hand, the correlation waveform having the peak value as shown in FIG. 5 is not obtained if the spread code in the IF data does not synchronize with the spread code from the spread code generation section 534. Any of the chip phases does not cause a peak that exceeds the predetermined threshold value.

Depending on whether a peak value exceeding the predetermined value exists in the correlation detection signal supplied to the correlation point detection section 538, for example, the correlation point detection section 538 determines whether or not the IF data as a received signal synchronizes with the PN code to be generated in the GPS receiver. When it is determined that the synchronization is found, the correlation point detection section 538 detects the phase for the above-mentioned peak value as a correlation point.

The above-mentioned description does not consider carrier components in the IF data. Actually, however, the received signal r(n) contains a carrier as indicated by equation (3) in FIG. 27. In equation (3), A indicates the amplitude, d(n) the data, fo the carrier angle frequency in an intermediate frequency signal, and n(n) the noise.

Let us suppose that the sampler 51 uses the sampling frequency fs and the sampling count N, i.e., $0 \leq n < N$ and $0 \leq k < N$. After the discrete Fourier transform, the relationship between the discrete frequency k and the actual frequency f is $f = k \cdot fs/N$ under the condition of $0 \leq k \leq N/2$ or $f = (k-N) \cdot fs/N$ ($f<0$) under the condition of $N/2 < k < N$. According to the discrete Fourier transform characteristic, however, R(k) or C(k) indicates circularity with $k<0$ or $k \geq N$.

In order to obtain the data d(n) from the received signal r(n), it is necessary to remove carrier components by synchronizing the spread code c(n) with the carrier $\cos 2\pi n f_0$. When only R(k) in equation (2) of FIG. 27 (to be described below) contains carrier components, the correlation waveform as shown in FIG. 5 is not obtained.

The embodiment employs a simple configuration of performing only the FFT process in the frequency area so as to be able to remove carrier components by synchronizing the spread code c(n) with the carrier $\cos 2\pi n f_0$.

That is to say, the FFT processing section 531 provides an FFT result of IF data as a received signal from the GPS satellite. Normally, FFT results are read from the memory 532 in the ascending order of frequencies of frequency components in the received signal and are supplied to the multiplication section 533. According to the embodiment, the DSP 53 functions as a read address control section. Read addresses are shift-controlled under control of the DSP 53 to sequentially read FFT results of the IF data from the memory 532.

The DSP 53 is supplied with information about the carrier frequency of the received signal. This information is detected by accurately estimating the Doppler shift amount for the GPS satellite from which the received signal is obtained and by accurately calibrating the oscillation frequency and the time information in the GPS receiver. The information about the carrier frequency can be created only inside the GPS receiver. Normally, the information can be also obtained from the outside via a communication network and the like.

The DSP 53 shifts a read address for the number of carrier frequencies based on the obtained information about the carrier frequency, sequentially reads FFT results of the IF data as the received signal from the memory 532, and supplies the read FFT results to the multiplication section 533.

In this manner, FFT results of the received signal r(n) are read from the memory 532 by shifting the read addresses for the number of carrier frequencies in the received signal. As will be discussed below, it is possible to obtain an FFT result equivalent to that of the received signal free of carrier components. Further, it is possible to reliably obtain correlation detection output causing a peak at the correlation point as shown in FIG. 5 by inversely diffusing a result of multiplying the FFT result free of carrier components by the FFT result for one cycle of the spread code.

As will be discussed below, there is provided an alternative to the method of controlling read addresses for FFT results from the memory 532. Carrier components in the received signal r(n) are added to FFT results of the spread code by controlling read addresses for the FFT results of the spread code from the memory 536. It is also possible to practically remove more carrier components by means of the multiplication in the multiplication section 533.

The following describes in more detail removal of carrier components through the synchronization between a received signal carrier and the PN code (spread code) by controlling read addresses from the memory 532 or 536 as well as digital matched filter operations in the DSP 53.

According to the embodiment, the DSP 53 performs digital matched filter processes. The principle of digital matched filter process is based on a theorem that, as indicated by equation (1) in FIG. 27, a convolution Fourier transform in the time area becomes a multiplication in the frequency area.

In equation (1), r(n) indicates the received signal in the time area and R(k) its discrete Fourier transform. Symbol c(n) represents the spread code from the spread code generation section and C(k) its discrete Fourier transform. Symbol n is the discrete time and k the discrete frequency. Symbol F[ ] indicates the Fourier transform.

When a correlation function for two signals r(n) and c(n) is newly defined as f(n), the discrete Fourier transform F(k) for f(n) represents the relation as indicated by equation (2) in FIG. 27. Therefore, given that r(n) is the signal from the A/D converter 45 in FIG. 2 and c(n) is the spread code from the spread code generation section 534, the correlation function f(n) for r(n) and c(n) can be computed in the following procedure using the above-mentioned equation (2) without using the ordinary definitional equation.

Compute the discrete Fourier transform R(k) for the received signal r(n).

Compute a complex conjugate of the discrete Fourier transform C(k) for the spread code c(n).

Compute F(k) in equation (2) using R(k) and the complex conjugate of C(k).

Compute the correlation function f(n) using an inverse discrete Fourier transform for F(k).

As mentioned above, if the spread code contained in the received signal r(n) matches the spread code c(n) from the spread code generation section 534, the correlation function f(n) computed in the above-mentioned procedure represents the time waveform that causes a peak at the correlation point as shown in FIG. 5. As mentioned above, since the embodiment applies the accelerating algorithms of FFT and inverse FFT to the discrete Fourier transform and the inverse Fourier transform, it is possible to considerably fast compute the correlation compared to the computation based on the definition.

The following describes the synchronization between a carrier contained in the received signal r(n) and the spread code.

As mentioned above, the received signal r(n) contains a carrier as indicated by equation (3) in FIG. 27. To obtain the data d(n) from the received signal r(n), it is necessary to remove the carrier by synchronizing the spread code c(n) and the carrier $\cos 2\pi n f_0$. If a carrier is contained in only R(k) of equation (2) in FIG. 27, the correlation waveform as shown in FIG. 5 cannot be obtained.

Figure 6:
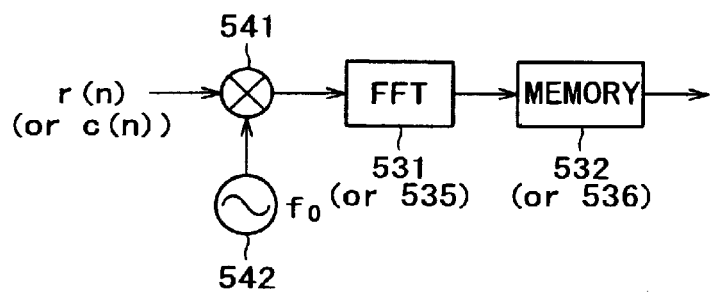
FIG. 6 shows another example of the synchronization acquisition process.

The carrier frequency $f_0$ for the received signal r(n) will become known if the Doppler shift amount is estimated accurately and the oscillation frequency and the time information in the GPS receiver are accurate. In this case, a multiplication section 541 is provided before the FFT processing section 531 as shown in FIG. 6. The multiplication section 541 multiplies the received signal r(n) by the carrier of frequency $f_0$ from a signal generation section 542 for frequency conversion. In this manner, it is possible to remove carrier components from the received signal r(n) before performing the FFT.

In this case, the memory 532 provides an FFT result of the received signal r(n) free of its carrier component. The multiplication section 533 multiplies this FFT result by an FFT result of the spread code c(n). As an output from the inverse FFT processing section 537, it is possible to reliably obtain a time waveform that causes a peak at the correlation point as shown in FIG. 5.

The same result is obtained by adding a carrier component to the spread code as indicated with parentheses in FIG. 6 without removing the carrier component from the received signal r(n). For this purpose, the multiplication section 541 is provided before the FFT processing section 535 for the spread code c(n). The multiplication section 541 multiplies the spread code c(n) by the carrier of frequency $f_0$ from the signal generation section 542.

In this case, a carrier component contained in the FFT result of the received signal read from the memory 532 synchronizes with an added carrier component contained in the FFT result of the spread code read from the memory 536. Accordingly, the inverse FFT processing section 537 provides a correlation detection output that causes a peak at the correlation point as shown in FIG. 5.

When the above-mentioned method in FIG. 6 is used to multiply a time area signal by a carrier frequency signal, it is necessary to especially use the multiplication section to remove carrier components. This method causes disadvantages of complicating the configuration and slowing down the processing speed for the multiplication operation.

According to the FFT characteristic, the above-mentioned frequency multiplication can be expressed as equation (4) in FIG. 27. In this equation (4), F[ ] is the discrete Fourier transform, $\phi 0$ is the phase difference with the carrier, and $k_0$ denotes k corresponding to $f_0$ where $f_0 = k_0 \cdot f_s/N$. According to equation (4), the FFT for the frequency-converted received signal r(n) as shown in FIG. 6 becomes equivalent to R(k) as the FFT for r(n) shifted by the carrier frequency $k_0$.

Figure 7:
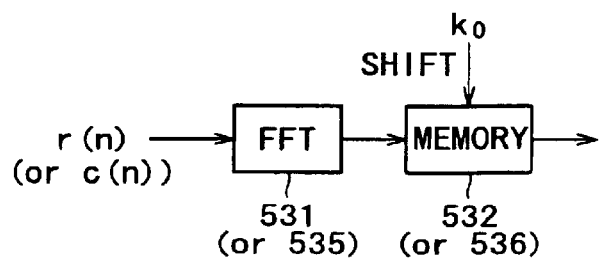
FIG. 7 shows still another example of the synchronization acquisition process.

According to the above-mentioned description, the configuration in FIG. 6 can be replaced by the configuration in FIG. 7. When reading FFT results for the received signal or the spread code from the memory 532 or 536, the configuration in FIG. 7 shifts the corresponding read addresses by the amount of the carrier frequency instead of multiplying the carrier frequency and the received signal r(n) or the spread code c(n) together.

When the received signal r(n) is shifted in FIG. 7, the down-conversion is performed to enable $k_0>0$. When the spread code c(n) is shifted, the up-conversion is performed to enable $k_0<0$.

As mentioned above, the signal generation section 542 in FIG. 6 becomes unnecessary when the FFT characteristic indicated with equation (4) is used. As shown in FIG. 7, it just needs to shift address phases for reading FFT results from the memory for a simplified configuration and high-speed processing.

The phase difference $\phi_0$ in equation (4) is unknown and therefore is omitted in FIG. 4. For example, a correlation function f'(n), where $0 \leq n < N$, is obtained as an operation result of the inverse FFT for F'(k) computed by equation (5) in FIG. 27 and becomes a complex number. When its real part is assumed to be $f_R'(n)$ and the imaginary part to be $f_I'(n)$, the amplitude $|f'(n)|$ at the correlation peak is obtained as indicated by equation (6) in FIG. 27. The phase $\phi$ is obtained as indicated by equation (7) in FIG. 27. Accordingly, it may be preferable to omit the multiplication exp ($j\phi_0$) at the right side of equation (4). The phase $\phi$ takes a value found by adding the phase difference $\phi_0$ in equation (4) to two values that correspond to the code of the data d(n) and differ from each other by the amount of $\pi$.

Outputs from the blocks in FIG. 4 indicate the signal outputs r(n) and c(n) and the operation results R(k), C(k), and f'(n) as mentioned above.

In this manner, the GPS receiver according to the embodiment uses the FFT to configure the digital matched filter. As shown in FIG. 4, the GPS receiver is configured to multiply an FFT result of the received signal and the spread code together by shifting memory addresses by the amount of the carrier frequency. The correlation point np can be obtained as the waveform as shown in FIG. 4, for example. If the correlation point np is found with respect to four GPS satellites, i.e., four types of spread codes c(n), it is possible to compute the position of the GPS receiver.

According to the embodiment, the digital matched filter process using FFT requires no multiplication in the time area in order to synchronize a carrier in the received signal with the spread code. During the multiplication between FFT results of the received signal and the spread code in the frequency area, the embodiment uses the simple method of shifting one of the FFT results of the received signal and the spread code to enable removal of carrier components in the received signal.

The example in FIG. 4 shifts a read address in the memory for the FFT result R(k) of the received signal. Further, it may be preferable to shift a read address in the memory for the FFT result C(k) of the spread code in a direction reverse to the shift for the FFT result R(k) of the received signal. This means an up-conversion in the multiplier.

The above-mentioned embodiment provides the spread code generation section 534 and the FFT processing section 535 separately. Further, it may be preferable to previously apply the FFT to spread codes corresponding to the respective GPS satellites and store the spread codes in the memory. This makes it possible to omit the FFT computation for the spread code c(n) when a satellite signal is received.

In this manner, the synchronization acquisition section 5 of the GPS receiver according to the embodiment fast performs a synchronization acquisition process using FFT, detects C/A code phases, carrier frequencies, correlation peak levels, and satellite numbers, and notifies them to the control section 7. The control section 7 supplies these to the synchronization hold section 6.

As indicated with a dotted line in FIG. 1, the synchronization acquisition section 5 can directly notify the synchronization hold section 6 of the C/A code phases, carrier frequencies, correlation peak levels, and satellite numbers that are detected in the synchronization acquisition section 5.

[Another Example (1) of Specific Configuration and Operations of the Synchronization Acquisition Section]

Figure 8:
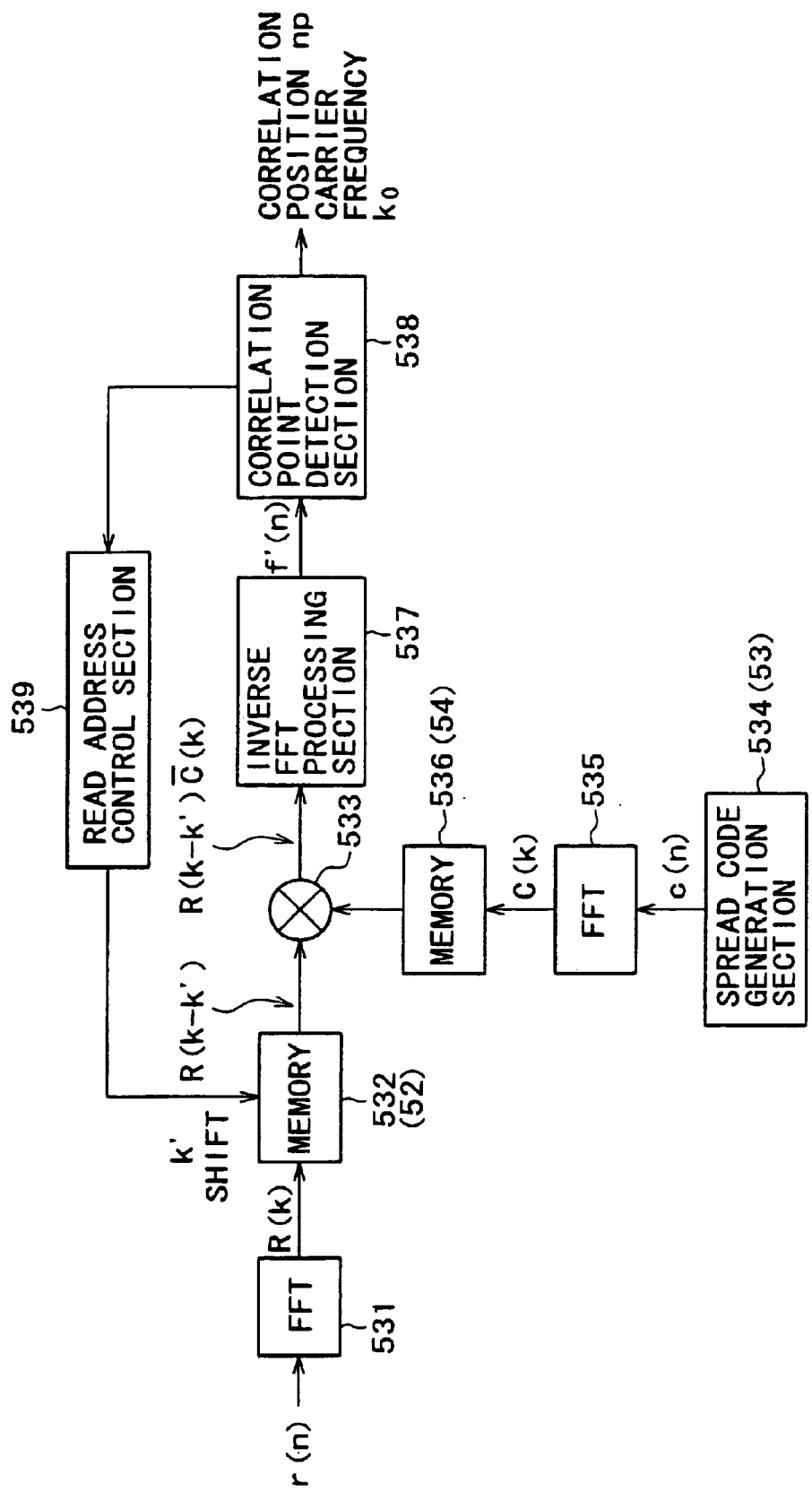
FIG. 8 is a block diagram showing another example (1) of the function of the DSP in the synchronization acquisition section shown in FIG. 1 and the synchronization acquisition process performed in the DSP.

The example in FIG. 4 uses a known carrier frequency in the received signal from the GPS satellite. Another example to be described below uses an unknown carrier frequency. FIG. 8 is a block diagram showing a specific configuration and operations of the synchronization acquisition section 5 according to this example. The mutually corresponding parts of the GPS receiver's synchronization acquisition section 5 in FIGS. 8 and 4 are designated by the same reference numerals.

In this example, as shown in FIG. 8, a correlation detection output from the correlation point detection section 538 is supplied to a read address control section 539. The read address control section 539 controls and changes the shift amount of read addresses from the memory 532 for FFT results of the received signal r(n) based on a correlation detection output from the correlation point detection section 538 with reference to an estimated address determined from past data. In this manner, the read address control section 539 allows correlation point detection section 538 to obtain a peak as shown in FIG. 5. When the correlation point detection section 538 successfully obtains the peak as shown in FIG. 5, the read address control section 539 stops the shift control over read addresses by determining the shift amount at that time.

Figure 9:
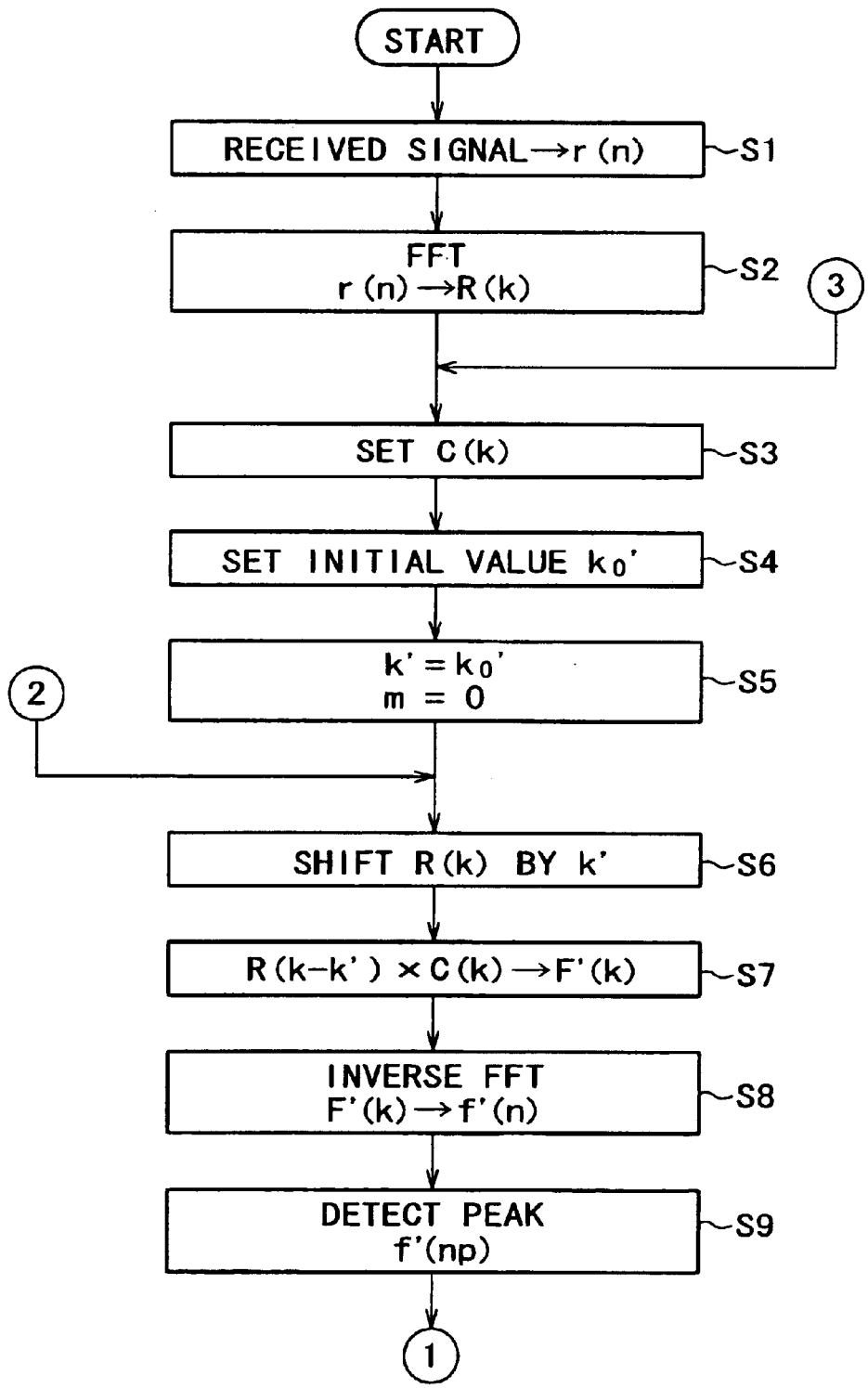
FIG. 9 is part of a flowchart for describing operations of the DSP having the function shown in FIG. 8.
Figure 10:
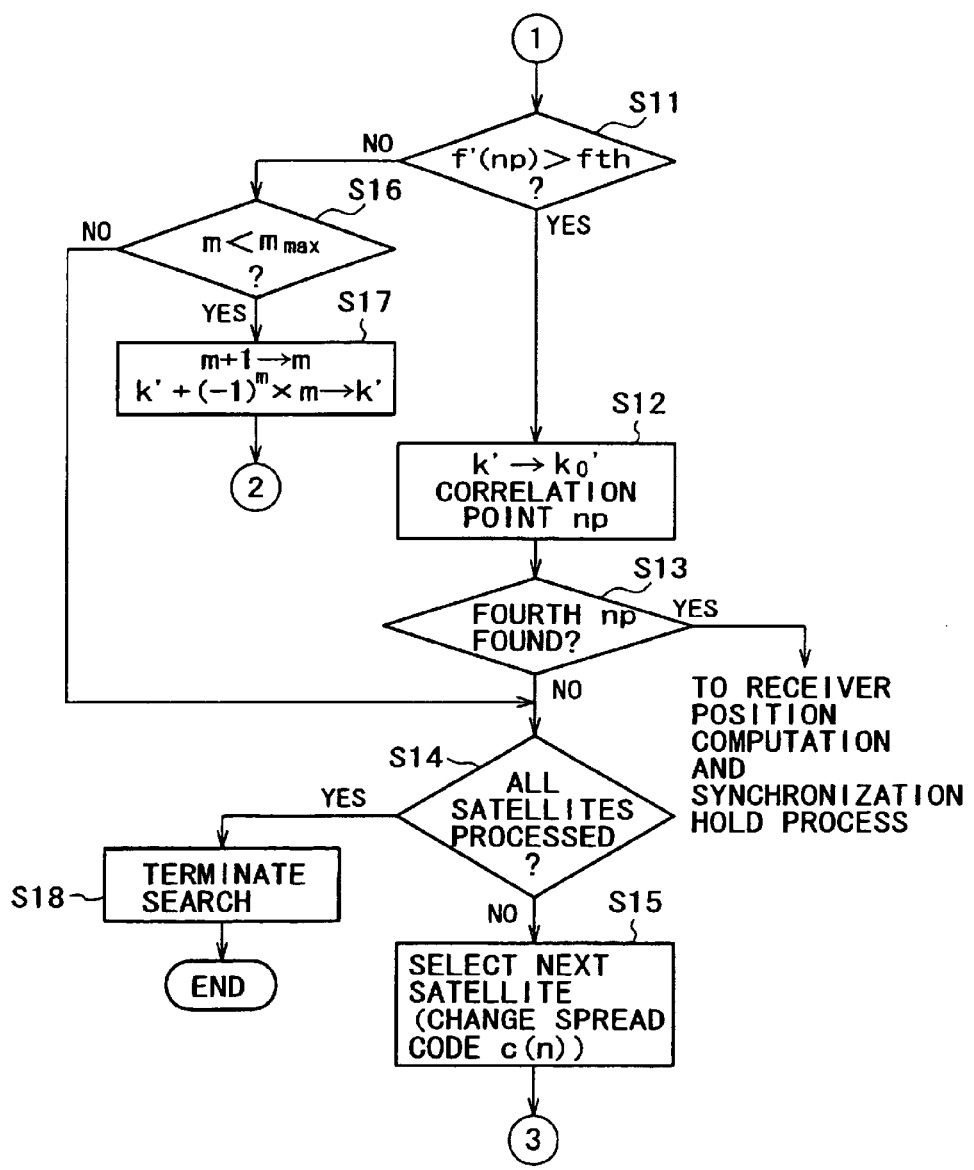
FIG. 10 is another part of a flowchart for describing operations of the DSP having the function shown in FIG. 8.

The following describes a process flow in the DSP 53 of the synchronization acquisition section 5 according to this example with reference to flowcharts in FIGS. 9 and 10. The flowcharts in FIGS. 9 and 10 correspond to software processes in the DSP 53.

The A/D converter 45 in the frequency conversion section 4 converts the IF signal (received signal) into a digital signal which is then stored as a signal r(n) in memory 52 (step S1). The FFT processing section 531 applies FFT to the signal r(n). The FFT result R(k) is written to the memory 532 (step S2). The process then places the FFT result C(k) of the spread code in the memory 536, wherein the spread code corresponds to a GPS satellite from which the signal is received (step S3).

The process determines an initial value $k_0'$ for the shift amount of read addresses from the memory 532 for the FFT result R(k) of the received signal r(n) from the past data (step S4). The process defines the determined initial value $k_0'$ to be a shift amount k' of read addresses from the memory 532 and sets the number of changes m for the shift control to an initial value m=0 (step S5).

The process reads the FFT result R(k) of the received signal r(n) from the memory 532 by shifting the read address by k' (step S6). The process then multiplies the read FFT result R(k-k') by the FFT result of the spread code to find a correlation function F'(k) (step S7).

The process performs inverse FFT for the correlation function F'(k) to find a function f'(n) in the time area (step S8). The process finds a peak value f'(np) for the function f'(n) (step S9). It is determined whether or not the peak value f'(np) is greater than a predetermined threshold value fth (step S11).

When the determination result at step S11 shows that the peak value f'(np) is smaller than the predefined threshold value fth, it is assumed that no correlation point is detected. The process determines whether or not the number of changes m for the shift control is smaller than the predefined maximum value $m_{max}$ (step S16). When it is determined that the number of changes m for the shift control is smaller than the predefined maximum value $m_{max}$, the process increments the number of changes m for the shift control by one (m=m+1), configures the new shift amount k' to be k'=k'+ $(-1)^m \times m$ (step S17), and returns to step S6. The process then repeats the above-mentioned steps from S6.

When it is determined that the number of changes m for the shift control is greater than or equal to the predefined maximum value $m_{max}$, the process determines whether or not the above-mentioned spread code synchronization search process is complete for all the satellites (step S14). When it is determined that the spread code synchronization search process is complete for all the satellites, the search operation terminates (step S18).

When it is determined at step S14 that there is a satellite for which the spread code synchronization search is not complete, the process selects the satellite for which the spread code synchronization search is to be performed. The process changes the spread code to c(n) to be used by the selected satellite (step S15). The process then returns to step S3 and repeats the succeeding steps after S3.

When it is determined at step S11 that the peak value f'(np) is greater than the predefined threshold value fth, the process detects, as a correlation point, the discrete time (spread code phase) np that takes the peak value f'(np). While the initial value $k_0$' is defined for the shift amount of read addresses from the memory 532 for the FFT result R(k), the process resets the initial value $k_0$' to the shift amount k' at that time (step S12).

The process determines whether or not the fourth correlation point np is detected (step S13). When it is determined that the fourth correlation point is detected, the process proceeds to a receiver position computation process and a synchronization hold process in the synchronization hold section 6 as will be described below. It is possible to estimate the Doppler shift amount for the receiving GPS satellite and an oscillation frequency error in the GPS receiver from the read address shift amount k' when the correlation point np detected at step S12 is obtained. That is to say, it is possible to detect the received signal's carrier frequency.

When it is determined at step S13 that the number of detected correlation points np is smaller than 4, the process determines whether or not the above-mentioned spread code synchronization search process is complete for all the satellites (step S14). When it is determined that the spread code synchronization search process is complete for all the satellites, the search operation terminates (step S18).

When it is determined at step S14 that there is a satellite for which the spread code synchronization search is not complete, the process selects the next satellite for which the spread code synchronization search is to be performed. The process changes the spread code to c(n) to be used by the selected satellite (step S15). The process then returns to step S3 and repeats the succeeding steps after S3. FIG. 8 also shows the above-mentioned signal outputs and operation results.

As mentioned above, even if an unknown carrier frequency is contained in the received signal from the GPS satellite, this example can remove carrier components by extensively using FFT processes in the frequency area and detecting the synchronization between the received signal carrier and the spread code. Accordingly, it is possible to fast and simply find a correlation point between the GPS received signal and the spread code using the FFT-based digital matched filter.

This example can also omit the FFT computation for the spread code c(n) during satellite signal reception by previously applying the FFT to spread codes corresponding to the respective GPS satellites and storing the spread codes in the memory.

[Another Example (2) of Specific Configuration and Operations of the Synchronization Acquisition Section]

As mentioned above, when the digital matched filter is used to detect a correlation point between the received signal and the spread code, one cycle of spread code is normally defined as a unit data length for detecting the correlation point.

As mentioned above, however, one data bit in a received signal from the GPS satellite is equivalent to 20 cycles of spread code. The code uses the same pattern for these 20 cycles. Based on this feature, the example here uses a plurality of spread code cycles as the unit data length for detecting the correlation point between the received signal and the spread code by means of the digital matched filter.

The receiving sensitivity improves by performing an FFT operation for received signals in units of a plurality of spread code cycles. A search for carrier frequencies becomes easier than the method of accumulating signals in the same time area. This example (another example (2)) will be further explained below.

There are existing examples of detecting a correlation point for one-cycle data accumulated for M cycles (M is 2 or larger integer) of the spread code in the time area (see, e.g., U.S. Pat. No. 4,998,111 or "An Introduction to Snap Track™ Server-Aided GPS Technology, ION GPS-98 Proceedings").

Figure 11:
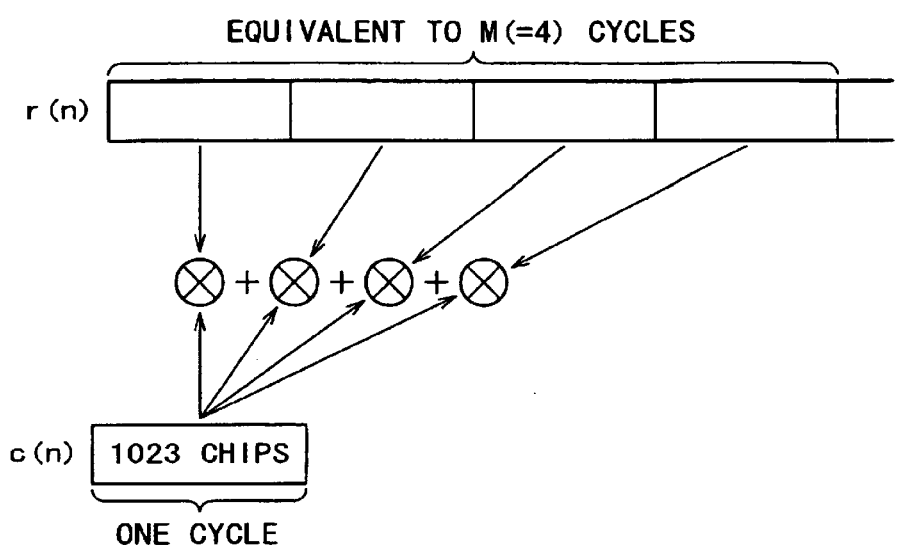
FIG. 11 is a block diagram showing still another example (2) of the synchronization acquisition process performed in the DSP of the synchronization acquisition section shown in FIG. 1.

As shown in FIG. 11, the method for the existing examples accumulates results of multiplication between the received signal r(n) and the spread code for M cycles. The method for the existing examples improves the C/N ratio by using the periodicity of received signals from the GPS satellite and the statistical characteristic of noises. When the received signal carrier previously synchronizes with the spread code, the C/N ratio improves M times. Therefore, the receiving sensitivity (sensitivity to detect the correlation point) improves M times.

If the received signal carrier does not synchronize with the spread code, however, M carriers with different phases are accumulated. As an accumulation result, the GPS signal itself is offset, disabling detection of the correlation peak.

When a carrier frequency is unknown, it is necessary to search for the carrier frequency. This necessitates an inefficient operation of performing accumulation for every frequency to be searched.

By contrast, the above-mentioned examples described with reference to FIGS. 4 and 8 can ensure synchronization between the received signal carrier and the spread code by means of the simple method of shifting read addresses for FFT results from the memory in the frequency area. Accordingly, it is possible to maximize the accumulation effect.

Like the method already described with reference to FIG. 8, the example here searches for carrier frequencies assuming that an unknown carrier frequency is contained in the received signal from the GPS satellite. At this time, the FFT is performed for the received signal r(n) every M cycles of spread code. A search is performed for received signal's carrier frequencies every M cycles of spread code by controlling the shift amount of read addresses for FFT results of the received signal from the memory.

In the above-mentioned FIG. 27, data d(n) in equation (3) is fixed to value 1 or −1 and therefore is negligible during M cycles of spread code under the condition of M≦20. Equation (3) then becomes r(n)=A·c(n) cos 2πnf$_0$+n(n). When the discrete Fourier transform is applied to this for the M cycle length, the number of data items is expressed as M×N, where N is the number of data items for one cycle of spread code. After the discrete Fourier transform, the relationship between k and the actual frequency f becomes f=kfs/MN under the condition of 0≦k≦MN/2 with reference to the sampling frequency fs or f=(k−MN)fs/MN (f<0) under the condition of MN/2<k<MN. The resolution is multiplied by M.

Figure 12:
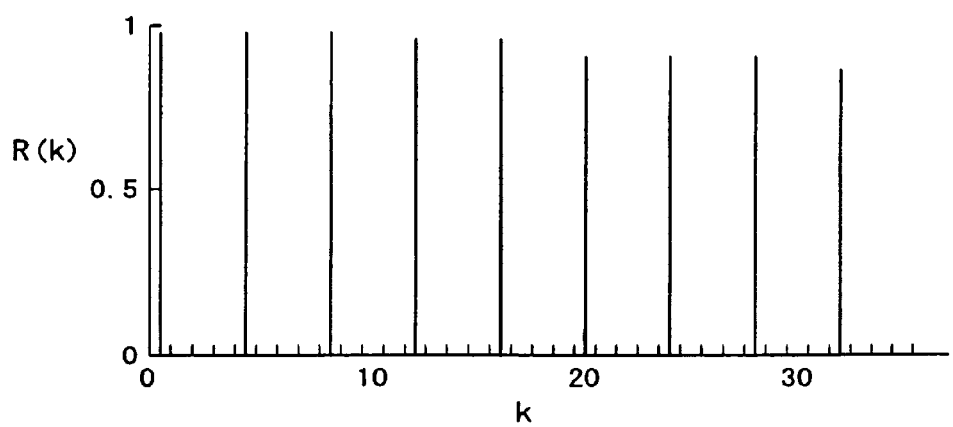
FIG. 12 is a block diagram showing still another example (2) of the synchronization acquisition process performed in the DSP of the synchronization acquisition section shown in FIG. 1.

However, the spread code c(n) is a cyclic signal. If the time for one cycle length is assumed to be T (T=one millisecond for the GPS C/A code), there is no frequency component having the accuracy of f=1/T or lower. After the discrete Fourier transform, the FFT result R(k) (0≦k<MN) of the received signal r(n) shows the spread code c(n) whose frequency components concentrate on every M data items, i.e., on a point of N data items out of MN data items. The amplitude is accumulated for M cycles and therefore becomes M times greater than the number of same frequency components per frequency length. FIG. 12 shows a spectrum example under the condition of M=4.

According to the example in FIG. 12, there is a signal spectrum at every fourth cycle. No signal component is found therebetween. Except a point of N data items, the spread code c(n) contains no frequency component. Since the noise n(n) is a non-cyclic signal in many cases, the energy is dispersed throughout all MN frequency components. Therefore, like the accumulation in the time area, the C/N ratio improves M times in the total sum of N frequency components for the spread code c(n) in the FFT result R(k) of the received signal r(n).

If the received signal r(n) does not contain the carrier component cos 2πnf$_0$ in equation (3) of FIG. 27, the frequency component of the spread code c(n) in the FFT result R(k) concentrates on k=i×M (0≦i<N). Actually, the carrier component exists. In this example, a read address for the FFT result R(k) from the memory is defined as k=(i×M)−k$_0$ per spread code cycle. The read address is cyclically shifted by the amount of the carrier frequency k$_0$.

Figure 13:
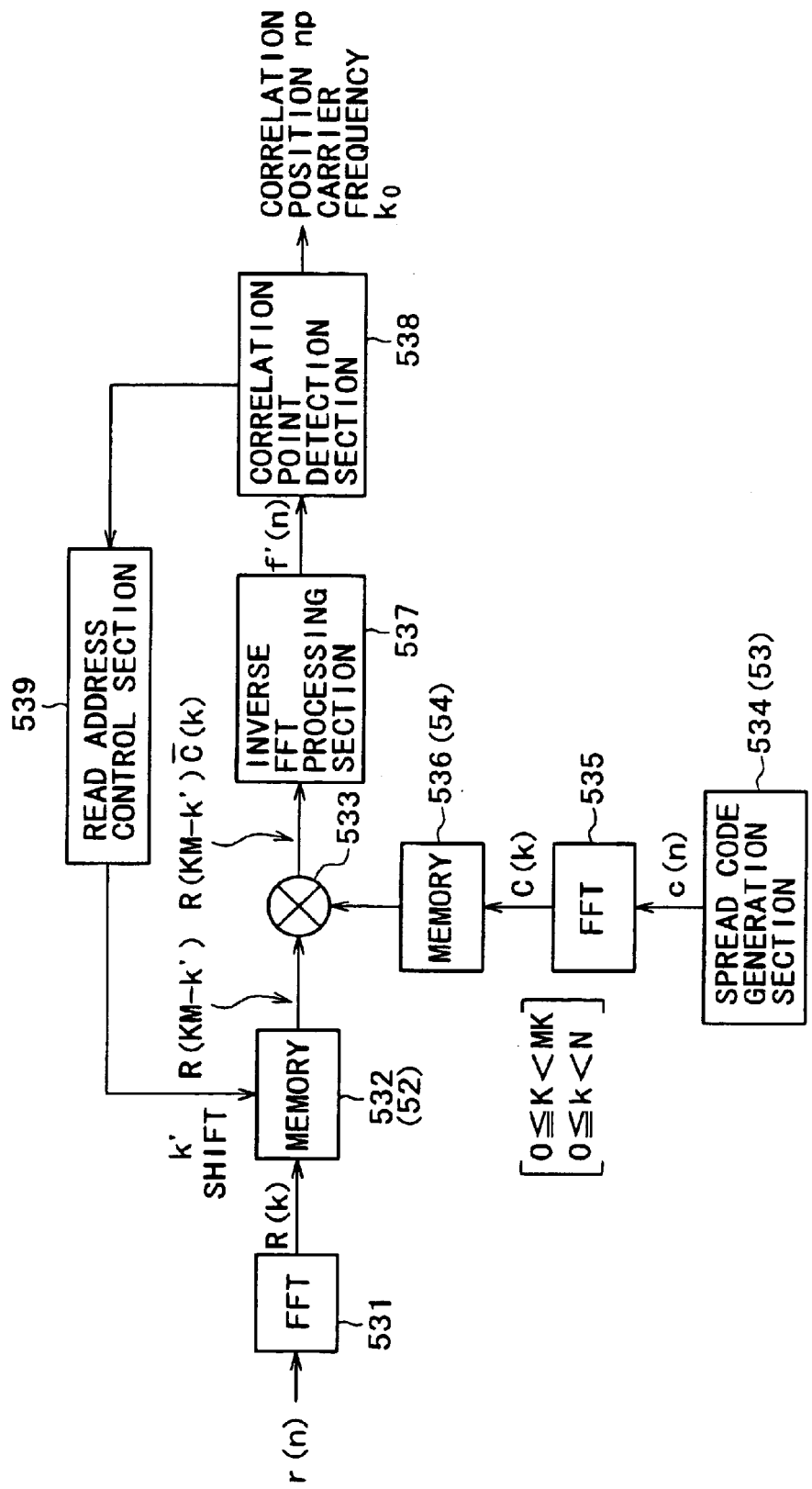
FIG. 13 is a block diagram showing still another example (2) of the synchronization acquisition process performed in the DSP of the synchronization acquisition section shown in FIG. 1.
Figure 14:
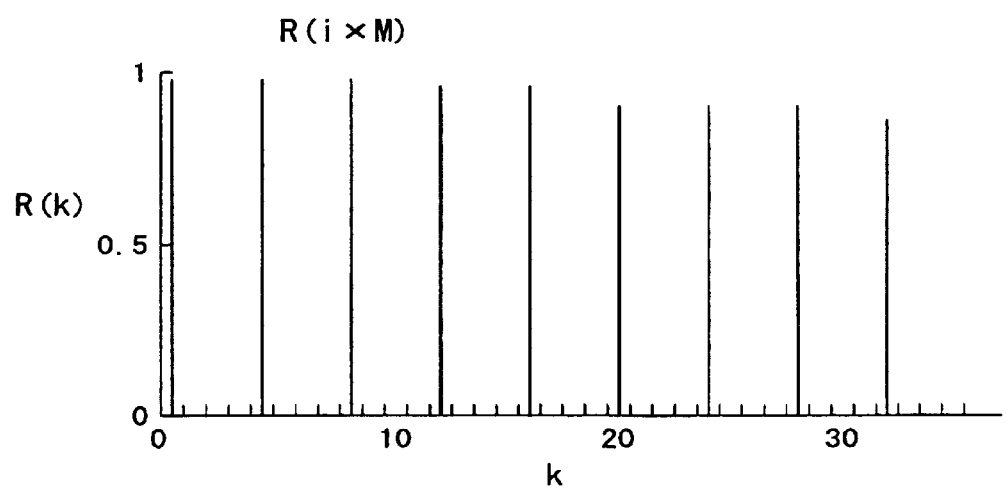
FIG. 14 illustrates yet another example (3) of the synchronization acquisition process performed in the DSP of the synchronization acquisition section shown in FIG. 1.
Figure 15:
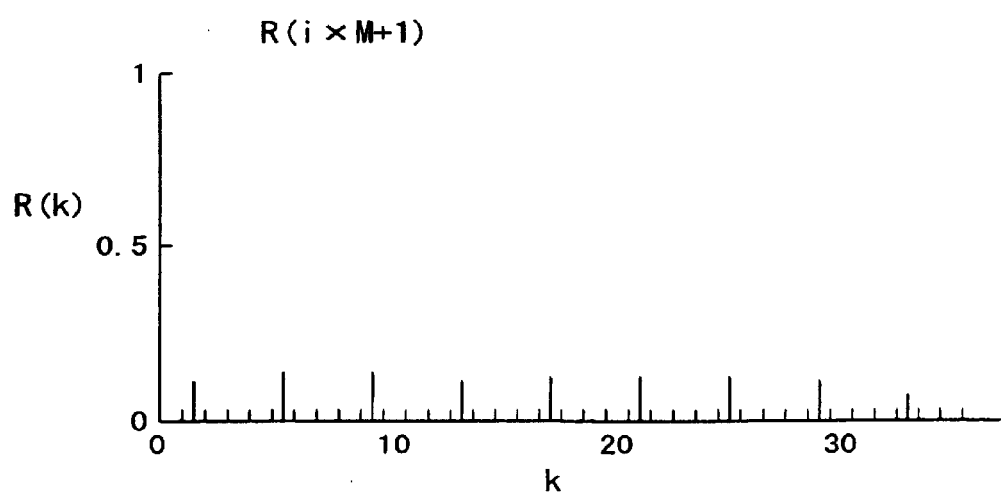
FIG. 15 illustrates yet another example (3) of the synchronization acquisition process performed in the DSP of the synchronization acquisition section shown in FIG. 1.
Figure 16:
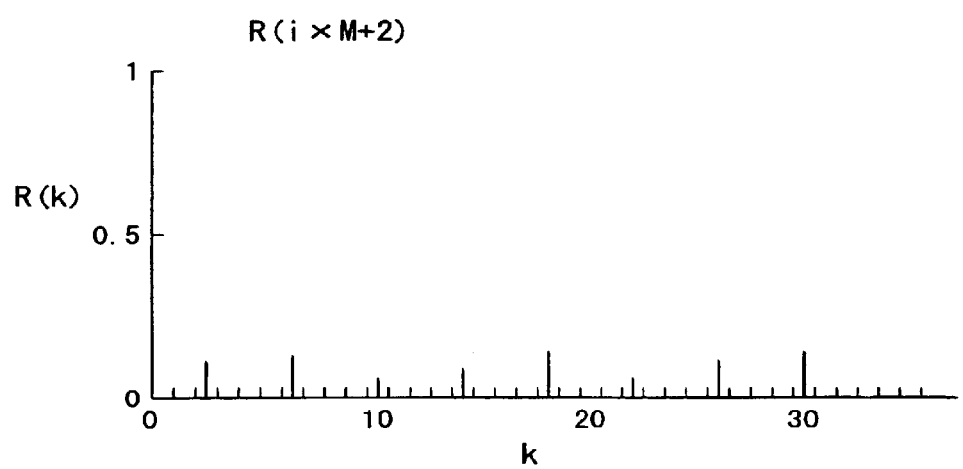
FIG. 16 illustrates yet another example (3) of the synchronization acquisition process performed in the DSP of the synchronization acquisition section shown in FIG. 1.
Figure 17:
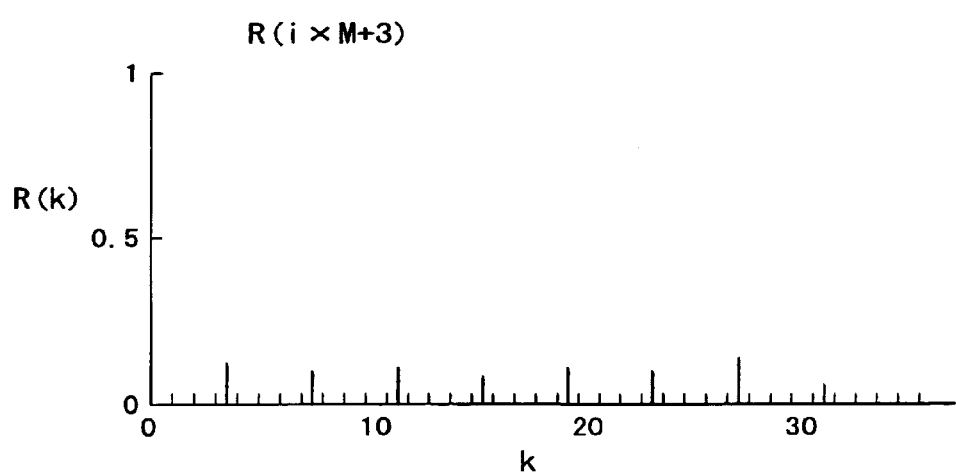
FIG. 17 illustrates yet another example (3) of the synchronization acquisition process performed in the DSP of the synchronization acquisition section shown in FIG. 1.

The overall configuration of the above-mentioned example is the same as that shown in FIG. 8. On the other hand, the IF data stored in the memory 52 is equivalent to M cycles of spread code. FIG. 13 shows a configuration that reflects the above-mentioned process operations on the internal configuration of the DSP 53. FIG. 13 assumes 0≦K<MN and 0≦k<N.

The FFT processing section 531 provides an FFT result R(K) whose FFT operation unit is equivalent to M cycles of spread code. The FFT result R(K) is written to the memory 532. The FFT result is read from the memory 532 with read addresses shift-controlled and is supplied to the multiplication section 533. This FFT result is multiplied by an FFT result of the spread code c(n) from the memory 536.

In this example, the correlation function F(k) obtained from multiplication section 533 is expressed as equation (8) in FIG. 27. In equation (8), k is contained in the complex conjugate for the FFT result C(k) of the spread code and k$_0$ is expressed as f$_0$=k$_0$·fs/MN.

At this time, the inverse FFT processing section 537 in FIG. 13 provides the correlation function f'(n) whose peak includes the spread code having M cycles of R(K). There appear M peaks within the range of 0≦n<MN. However, it just needs to detect one correlation point per spread code cycle. Like the examples with reference to FIGS. 4 and 8, the inverse FFT processing section 537 needs to perform computation only within the range of 0≦n<N, eliminating the need for computation within the range of N≦n<MN.

As mentioned above, this example determines the number of FFTs for the received signal r(n) by multiplying one cycle of spread code by M. It is possible to improve the sensitivity for detecting a correlation point, i.e., the receiving sensitivity.

This example can also omit the FFT computation for the spread code c(n) during satellite signal reception by previously applying the FFT to spread codes corresponding to the respective GPS satellites and storing the spread codes in the memory.

[Another Example (3) of Specific Configuration and Operations of the Synchronization Acquisition Section]

The above-mentioned another example (2) of specific configuration and operations of the synchronization acquisition section enables a search for unknown carrier frequencies and improves the receiving sensitivity by performing an FFT process for the received signal r(n) containing M cycles (M>1) of spread code. However, the number of data samples becomes MN, i.e., N samples per spread code cycle multiplied by M, increasing the FFT computation time and the capacity of the memory 532 in FIG. 13. The example here (another example (3)) improves this problem of the memory capacity.

When M cycles (M>1) of spread code are defined as an FFT process unit like the example in FIG. 12, components between every M frequency components are unnecessary.

Here, the FFT result R(K), where 0≦K<MN, is divided into M sets such as R(i×M), R(i×M+1), R(i×M+2), ..., R(i×M+M−1), where 0≦i<N. When the FFT result R(K) is divided into four sets (M=4), FIGS. 14 through 17 show examples of divided spectrums in the respective sets. Though the carrier frequency is unknown, one of M sets contains an energy of the GPS signal for which the correlation needs to be detected. The examples in FIGS. 14 through 17 show that the R(i×M) set in FIG. 14 contains a frequency component of the received signal r(n) and the remaining three divided spectrums just contain noises.

In an actual signal, the carrier frequency k$_0$ is not accurately k'=k$_0$. If k$_0$ is situated between k$_0$' and k$_0$'+1, for example, correlations are detected in both k'=k$_0$' and k'=k$_0$'+1. The frequency nearer to k$_0$ indicates a larger correlation.

When the FFT result R(K) is divided into M sets, where M is obtained by raising 2 to any exponent, each set can be computed independently according to the characteristic of the FFT computation procedure.

Figure 18:
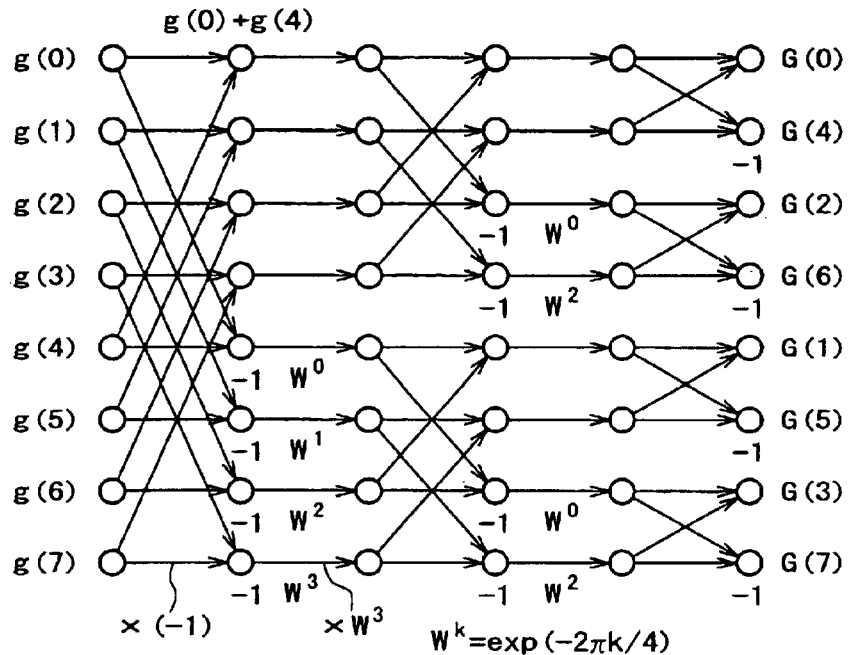
FIG. 18 diagrams details of yet another example (3) of the synchronization acquisition process performed in the DSP of the synchronization acquisition section shown in FIG. 1.
Figure 19:
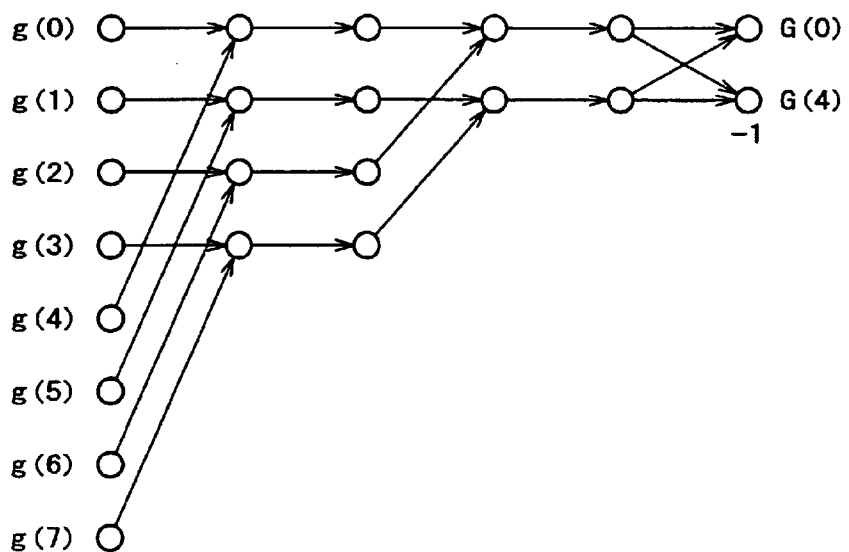
FIG. 19 diagrams details of yet another example (3) of the synchronization acquisition process performed in the DSP of the synchronization acquisition section shown in FIG. 1.

FIG. 18 shows a flow of signals for FFT computation of eight data items g(0) through g(7). When the FFT result G(K) in FIG. 18 is divided into every fourth data, there are provided four sets such as (G(0),G(4)), (G(1),G(5)), (G(2),G(6)), and (G(3),G(7)). Paying attention to (G(0),G(4)) makes it clear that just the computation shown in FIG. 19 is sufficient. This computation scheme is the same as that for the other sets (G(1),G(5)), (G(2),G(6)), and (G(3),G(7)).

When these four sets of data are verified one by one, the set (G(0),G(4)) is computed first. After it is verified, the process frees the memory storing (G(0),G(4)) and proceeds to the next set. The remaining sets (G(1),G(5)), (G(2),G(6)), and (G(3),G(7)) are computed in order. The memory is freed after each set has been verified. A sequence of these operations consumes just a quarter of the memory capacity required for the FFT to find G(0) through G(7) at a time. The number of multiplications is unchanged whether each of M sets is computed individually or the entire M sets are computed by the FFT at a time.

The same technique as the above-mentioned example can be applied to R(i×M), R(i×M+1), R(i×M+2), . . . , and R(i×M+M−1) by defining M to be 2 raised to any exponent. The memory capacity for storing the FFT result just needs to be 1/M of MN, i.e., N. When an attempt is made to detect the correlation point in the order of R(i×M), R(i×M+1), R(i×M+2), . . . , and R(i×M+M−1), the correlation point may be detected at an intermediate set. The remaining sets need not be verified. It is expected to shorten the processing time compared to the detection method of applying the FFT process to the received signal for every M cycles of spread code at a time.

Figure 20:
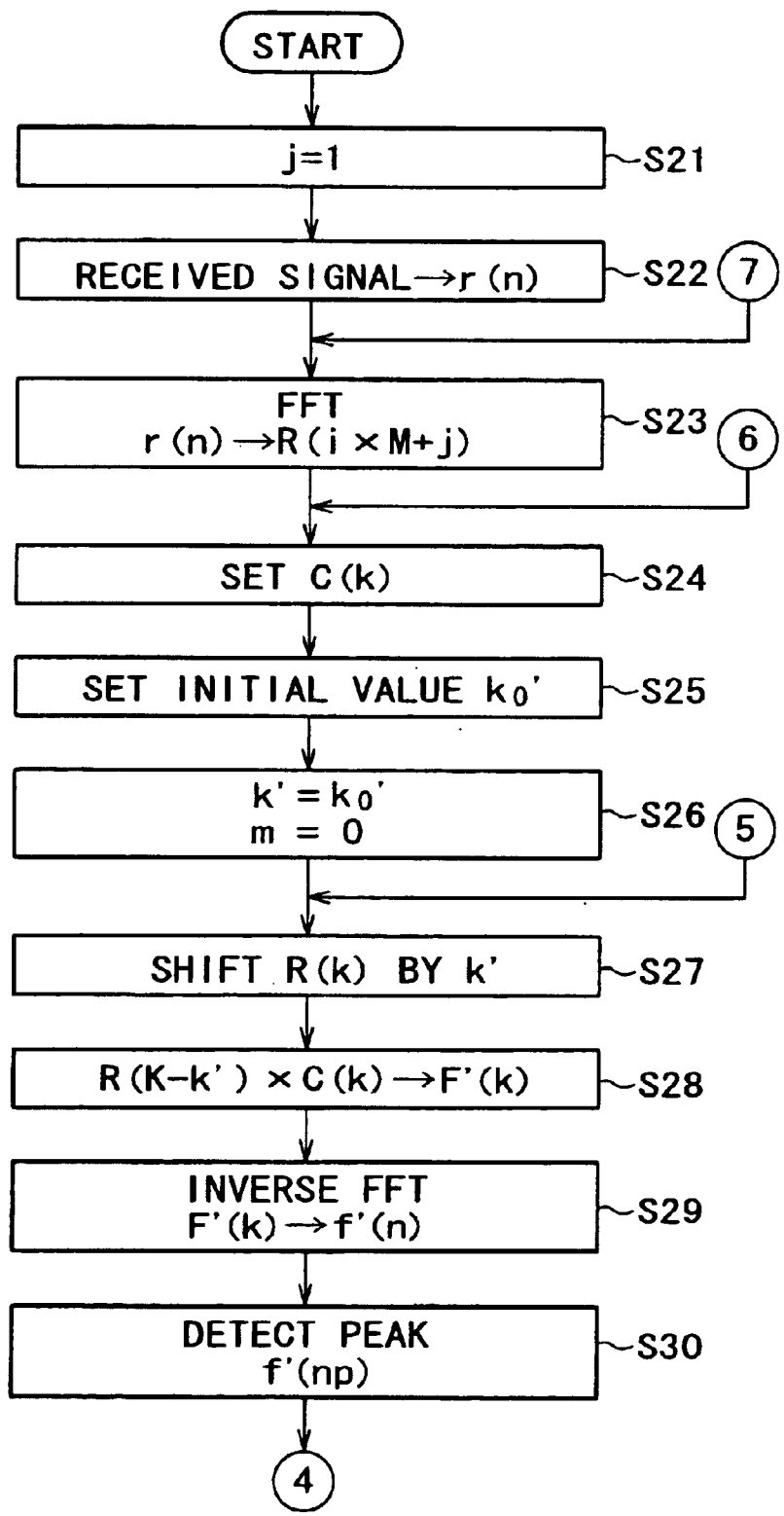
FIG. 20 is part of a flowchart for showing operations in the DSP shown in FIG. 13.
Figure 21:
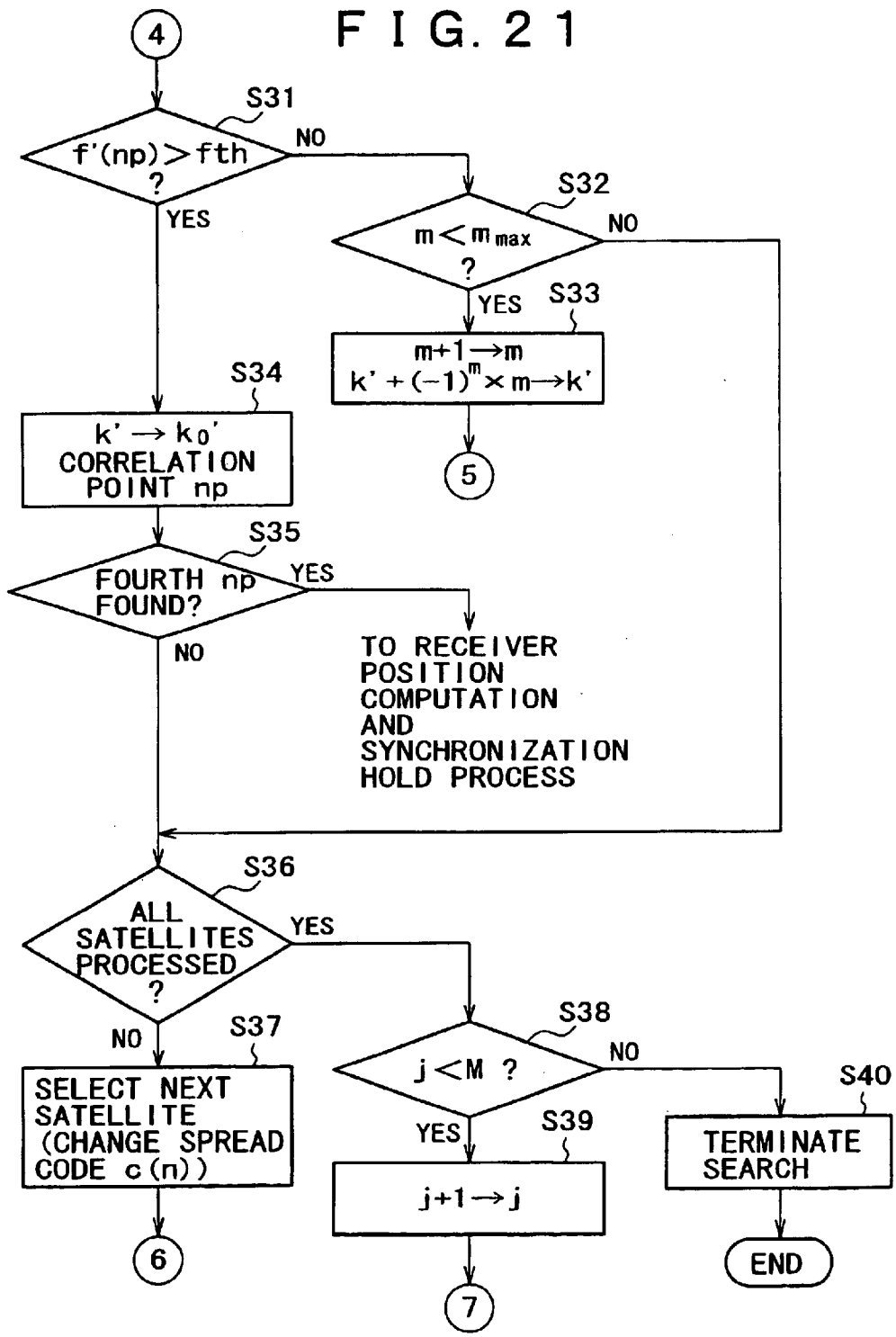
FIG. 21 is another part of a flowchart for showing operations in the DSP shown in FIG. 13.

FIGS. 20 and 21 show flowcharts for the spread code and carrier synchronization in the above-mentioned example. In order to minimize the number of FFTs, the example in FIGS. 20 and 21 searches for carrier frequencies in each FFT set and detects the correlation for all satellites to be targeted. The flowcharts in FIGS. 20 and 21 correspond to software processes in the synchronization acquisition section 5 of the DSP 53.

The process initializes variable j ($0 \leq j \leq M$) for the number of sets to divide R(K), where $0 \leq K < MN$ and K=i×M+j (step S21). The A/D converter 45 in the frequency conversion section 4 converts the received signal into a digital signal that is then stored as signal r(n) in the memory 52, where $0 \leq n \leq MN$ (step S22). The FFT processing section 531 applies FFT to the signal r(n) and writes its FFT result R(K) to the memory 532, where K=i×M+j (step S23). Assuming that there is FFT result C(k) of the spread code corresponding to the GPS satellite from which the signal was received, the FFT result C(k) is set to the memory 536 (step S24).

Based on the past data, for example, the process determines an initial value $k_0'$ for the shift amount of read addresses from the memory 532 for the FFT result R(K) of the received signal r(n) (step S25). The process defines the determined initial value $k_0'$ to be a shift amount k' of read addresses from the memory 532 and sets the number of changes m for the shift control to an initial value m=0 (step S5).

The process reads the FFT result R(K) of the received signal r(n) from the memory 532 by shifting the read address by k' (step S27). The process then multiplies the read FFT result R(K−k') by the FFT result of the spread code to find a correlation function F'(k) (step S28).

The process performs inverse FFT for the correlation function F'(k) to find a function f'(n) in the time area (step S29). The process finds a peak value f'(np) for the function f'(n) (step S30). It is determined whether or not the peak value f'(np) is greater than a predetermined threshold value fth (step S31).

When the determination result at step S31 shows that the peak value f'(np) is smaller than the predefined threshold value fth, it is assumed that no correlation point is detected. The process determines whether or not the number of changes m for the shift control is smaller than the predefined maximum value $m_{max}$ (step S32). When it is determined that the number of changes m for the shift control is smaller than the predefined maximum value $m_{max}$, the process increments the number of changes m for the shift control by one (m=m+1), configures the new shift amount k' to be k'=k'+ $(-1)^m \times m$ (step S33), and returns to step S27. The process then repeats the above-mentioned steps from S27.

When it is determined that the number of changes m for the shift control is greater than or equal to the predefined maximum value $m_{max}$, the process determines whether or not the above-mentioned spread code synchronization search process is complete for all the satellites (step S36). When it is determined that the spread code synchronization search process is complete for all the satellites, the process determines whether or not the variable j is smaller than the maximum value M (step S38). When the variable j is smaller than the maximum value M, the process increments the variable j (step S39). The process then returns to step S23 and repeats the above-mentioned steps from S23.

When it is determined at step S38 that the variable is greater than or equal to the maximum value M, the search operation terminates (step S40).

When it is determined at step S36 that there is a satellite for which the spread code synchronization search is not complete, the process selects the next satellite for which the spread code synchronization search is to be performed. The process changes the spread code to c(n) to be used by the selected satellite (step S37). The process then returns to step S24 and repeats the succeeding steps after S24.

When it is determined at step S31 that the peak value f'(np) is greater than the predefined threshold value fth, the process detects, as a correlation point, the discrete time (spread code phase) np that takes the peak value f'(np). While the initial value $k_0'$ is defined for the shift amount of read addresses from the memory 532 for the FFT result R(k), the process resets the initial value $k_0'$ to the shift amount k' at that time (step S34).

The process determines whether or not the fourth correlation point np is detected (step S35). When it is determined that the fourth correlation point is detected, the process proceeds to the receiver position computation process and the synchronization hold process. It is possible to estimate the Doppler shift amount for the receiving GPS satellite and an oscillation frequency error in the GPS receiver from the read address shift amount k' when the correlation point np detected at step S34 is obtained.

When it is determined at step S35 that the number of detected correlation points np is smaller than 4, the process proceeds to step S36 and performs the succeeding steps after S36.

When the carrier frequency is known like the method as described with reference to FIG. 4, it just needs to compute only a relevant set out of R(i×M), R(i×M+1), R(i×M+2), . . . , and R(i×M+M−1). In this case, it is likewise possible to use the method of applying the FFT to the received signal in units of time intervals including a plurality of cycles of spread code.

A sliding correlator as a conventional technique requires considerable time in principle. By contrast, the above-mentioned four examples provide the methods of acquiring synchronization between the GPS receiver's spread code and the carrier in order to be able to greatly shorten the processing time through the use of the high-speed DSP and the like.

While the above-mentioned description of the embodiment has applied the present invention to received signals from GPS satellites, the present invention is not limited to signals from GPS satellites. The present invention is also applicable to all cases of acquiring synchronization between a received signal's spread code and a carrier even if the received signal's carrier wave is modulated by a signal containing data that is spectrum-spread by the spread code.

[About the Synchronization Hold Section]

The synchronization hold section 6 configures C/A code phases, carrier frequencies, and satellite numbers supplied from the synchronization acquisition section 5 via the control section 7 in accordance with these pieces of information. The synchronization hold section 6 fast acquires the carrier frequency synchronization and the C/A code phase synchronization for IF data from the frequency conversion section 4. The synchronization hold section 6 then holds the acquired carrier frequency synchronization and C/A code phase synchronization.

In this case, the synchronization hold section 6 uses the carrier frequency synchronization and the C/A code phase synchronization acquired in the synchronization acquisition section 5 to instantly hold the carrier frequency synchronization and the C/A code phase synchronization and maintain the synchronized state. In this embodiment, the synchronization hold section 6 comprises a Costas loop and a DLL (Delay Locked Loop).

Figure 22:
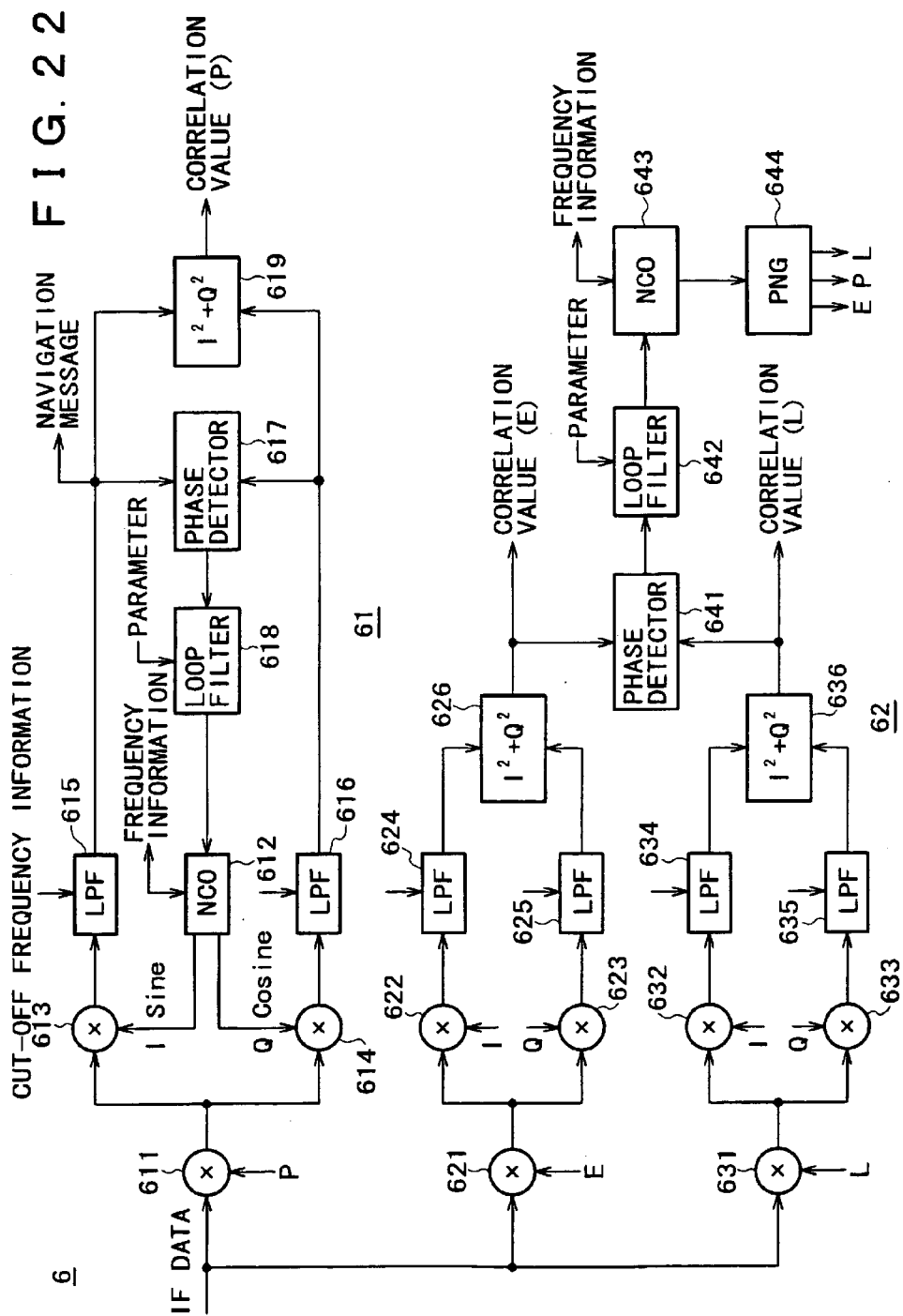
FIG. 22 is a block diagram showing an example of a synchronization hold section in the GPS receiver shown in FIG. 1.

FIG. 22 is a block diagram showing a configuration example of the synchronization hold section 6. In FIG. 22, a Costas loop 61 is designated by reference numerals 612 through 619. In FIG. 22, a DLL 62 is designated by reference numerals 621 through 644.

The Costas loop 61 holds the carrier frequency synchronization and extracts navigation messages as transmission data. The DLL 62 holds the C/A code phase synchronization. The Costas loop 61 and the DLL 26 together perform an inverse spectrum spread for IF data as a received signal to obtain a signal before the spectrum spread using the same PN code as the spectrum-spread PN code. Further, the Costas loop 61 and the DLL 26 demodulate the signal before the spectrum spread to obtain a navigation message and supply this message to the control section 7. The following describes operations of the Costas loop 61 and the DLL 62 more specifically.

(About the Costas Loop 61)

The IF data from the frequency conversion section 4 is supplied to multipliers 611, 621, and 631 in the synchronization hold section 6. As shown in FIG. 22, the multipliers 611, 621, and 631 are supplied with a matching (prompt) PN code P, an advanced (early) PN code E, and a delayed (late) PN code L, respectively, from a PN code generator (indicated as PNG in FIG. 22) 644.

As will be discussed below, the PN code generator 644 generates the prompt PN code P, the early PN code E, and the late PN code L based on signals from an NCO 643. In this case, the NCO 643 is supplied with frequency information that is configured in the control section 7 based on a acquisition result in the synchronization acquisition section 5. The NCO 643 forms a signal for controlling the PN code generator 644 so as to generate a PN code that equals the spectrum-spread PN code spectrum-spreading the IF data as a received signal targeted for synchronization holding and has a matching phase without gain or loss. The NCO 643 then supplies that signal to the PN code generator 644.

As mentioned above, the PN code generator 644 supplies the matching (prompt) PN code P, the advanced (early) PN code E, and the delayed (late) PN code L to the multipliers 611, 621, and 631, respectively, based on the signal from the NCO 643. The matching (prompt) PN code P is the same as the spectrum-spread PN code spectrum-spreading the IF data as a received signal targeted for synchronization holding and has a matching phase without gain or loss. The advanced (early) PN code E is configured to advance the phase for a specified amount with reference to the matching (prompt) PN code P. The delayed (late) PN code L is configured to delay the phase for a specified amount with reference to the matching (prompt) PN code P.

A multiplier 611 is provided before the Costas loop 61. The multiplier 611 multiplies IF data from the frequency conversion section 4 by the prompt PN code P from the PN code generator 644 for an inverse spectrum spread. The multiplier 611 supplies an inversely spread signal to the Costas loop 61.

As shown in FIG. 22, the Costas loop 61 comprises a numerically controlled oscillator (hereafter referred to as NCO) 612; multipliers 613 and 614; LPFs (LowPass Filters) 615 and 616; a phase detector 617; a loop filter 618; and a correlation detector 619.

A signal inversely spread in the multiplier 611 is supplied to the multipliers 613 and 614 in the Costas loop 61. Further, as shown in FIG. 22, the multiplier 613 is supplied with an I signal (Sine); the multiplier 614 is supplied with a Q signal (Cosine). The I and Q signals are formed in the NCO 612 in accordance with carrier frequencies as frequency information from the control section 7.

The multiplier 613 multiplies the inversely spread IF data and the I signal from the NCO 612 together and supplies its result to the phase detector 617 via the LPF 615. The multiplier 614 multiplies the inversely spread IF data and the Q signal from the NCO 612 together and supplies its result to the phase detector 617 via the LPF 616.

The LPFs 615 and 616 are supplied with cut-off frequency information from the control section 7 and remove out-of-band noises from the supplied signal. Based on output signals from the LPFs 615 and 616, the phase detector 617 detects a phase error between the IF data carrier and the signal generated from the NCO 612, e.g., at an interval of one millisecond. The phase detector 617 supplies the phase error to the NCO 612 via the loop filter 618. In this manner, the NCO 612 is so controlled that the phase of the output carrier signal from the NCO 612 follows a carrier component in the received signal.

The loop filter 618 in the Costas loop 61 integrates the phase error from the phase detector 617 in accordance with parameters supplied from the control section 7 and forms an NCO control signal to control the NCO 612. As mentioned above, based on the NCO control signal from the loop filter 618, the NCO 612 is so controlled that the phase of the output carrier signal from the NCO 612 follows a carrier component in the received signal.

Outputs from the LPFs 615 and 616 in the Costas loop 61 are supplied to the correlation detector 619. The correlation detector 619 multiplies by itself the output signals supplied from the LPFs 615 and 616, performs an addition, and outputs the result. The output from the correlation detector 619 indicates a correlation value (P) between the IF data and the prompt PN code P from the PN code generator 644. The correlation value (P) is stored, e.g., in a register (not shown) to be used by the control section 7.

Based on the correlation value (P) from the correlation detector 619, the control section 7 determines whether the carrier frequency synchronization is locked or unlocked. When unlocked, the control section 7 controls the Costas loop 61 so as to incorporate and lock the carrier frequency.

The LPF 615 outputs demodulated transmission data. This data is decoded and is configured to be used as a navigation message in the control section 7.

(About the DLL 62)

A multiplier 621 multiplies IF data from the frequency conversion section 4 by the early PN code E from the PN code generator 644 for an inverse spectrum spread. The multiplier 621 supplies an inversely spread signal to multipliers 622 and 623 in the DLL 62. As mentioned above, the multiplier 622 is supplied with the I signal formed in the NCO 612. The multiplier 623 is supplied with the Q signal formed in the NCO 612.

The multiplier 622 multiplies the inversely spread IF data and the I signal from the NCO 612 together and supplies its result to the correlation detector 626 via the LPF 624. Likewise, the multiplier 623 multiplies the inversely spread IF data and the Q signal from the NCO 612 together and supplies its result to the correlation detector 626 via the LPF 625. Like the LPFs 615 and 616 in the Costas loop 61, the LPFs 624 and 625 are supplied with cut-off frequency information from the control section 7 and remove out-of-band noises from the supplied signal.

The correlation detector 626 multiplies by itself the output signals supplied from the LPFs 624 and 625, performs an addition, and outputs the result. The output from the correlation detector 626 indicates a correlation value (E) between the IF data and the early PN code E from the PN code generator 644. The correlation value (E) is supplied to the phase detector 641 and is stored, e.g., in a register (not shown) to be used by the control section 7.

Likewise, A multiplier 631 multiplies IF data from the frequency conversion section 4 by the late PN code L from the PN code generator 644 for an inverse spectrum spread. The multiplier 631 supplies an inversely spread signal to multipliers 632 and 633 in the DLL 62. As mentioned above, the multiplier 632 is supplied with the I signal formed in the NCO 612. The multiplier 633 is supplied with the Q signal formed in the NCO 612.

The multiplier 632 multiplies the inversely spread IF data and the I signal from the NCO 612 together and supplies its result to the correlation detector 636 via the LPF 634. Likewise, the multiplier 633 multiplies the inversely spread IF data and the Q signal from the NCO 612 together and supplies its result to the correlation detector 626 via the LPF 635. Like the above-mentioned LPFs 624 and 625, the LPFs 634 and 635 are supplied with cut-off frequency information from the control section 7 and remove out-of-band noises from the supplied signal.

The correlation detector 636 multiplies by itself the output signals supplied from the LPFs 634 and 635, performs an addition, and outputs the result. The output from the correlation detector 636 indicates a correlation value (L) between the IF data and the late PN code L from the PN code generator 644. The correlation value (L) is supplied to the phase detector 641 and is stored, e.g., in a register (not shown) to be used by the control section 7.

The phase detector 641 is supplied with the correlation value (E) from the correlation detector 626 and the correlation value (L) from the correlation detector 636 and detects a phase error between both. The phase detector 641 forms a signal to adjust an output signal from the NCO to be supplied to the PN code generator 644 so that the correlation values (E) and (L) become the same level based on the phase error. The phase detector 641 supplies the signal to the NCO 643 via a loop filter 642.

As mentioned above, the NCO 643 is supplied with frequency information indicative of an initial frequency from the control section 7 in accordance with a hold result from the synchronization acquisition section 5. The NCO 643 generates a signal for operating the PN code generator 644 so as to generate a PN code synchronized with the PN code spectrum-spreading the IF data as a signal from the targeted GPS satellite. As mentioned above, the NCO 643 adjusts the phase of a signal to be supplied to the PN code generator 644 via the loop filter 642 based on the signal from the phase detector 641.

In this manner, an adjustment is made to the phase of a PN code to be generated in the PN code generator 644 in accordance with the signal from the NCO 643. The prompt PN code P generated in the PN code generator 644 can follow the PN code spectrum-spreading the IF data. It is possible to accurately perform the inverse spectrum spread for IF data using the prompt PN code P. The Costas loop 61 can demodulate reception data.

Like the above-mentioned loop filter 618 in the Costas loop 61, the loop filter 642 in the DLL 62 integrates phase error information from the phase detector 641 based on parameters supplied from the control section 7 and forms an NCO control signal for controlling the NCO 643.

In this manner, the synchronization hold section 6 synchronizes and holds the IF data processed by the spread spectrum modulation. The Costas loop 61 in the synchronization hold section 6 demodulates a navigation message as transmission data. As mentioned above, the LPF 615 provides demodulated output of the navigation message. The navigation message is supplied to a data demodulation circuit (not shown) and is demodulated to data that can be supplied to the control section 7. The navigation message is then supplied to the control section 7 and is used for the positioning computation.

Actually, it is necessary to be able to receive signals from a plurality of different GPS satellites and concurrently process the signals. For this purpose, the synchronization hold section 6 is configured to contain a part comprising at least four Costas loops 61 and DLLs 62. The part comprising each of parallel provided Costas loops 61 and DLLs 62 acquires (incorporates) and holds synchronizations for the carrier frequency and the C/A code as mentioned above to obtain navigation messages.

[About the Control Section]

The control section controls each part of the GPS receiver according to the embodiment. Further, the control section 7 is supplied with navigation messages from the synchronization hold section 6 to perform positioning operations or various time detections (time measurements).

Figure 23:
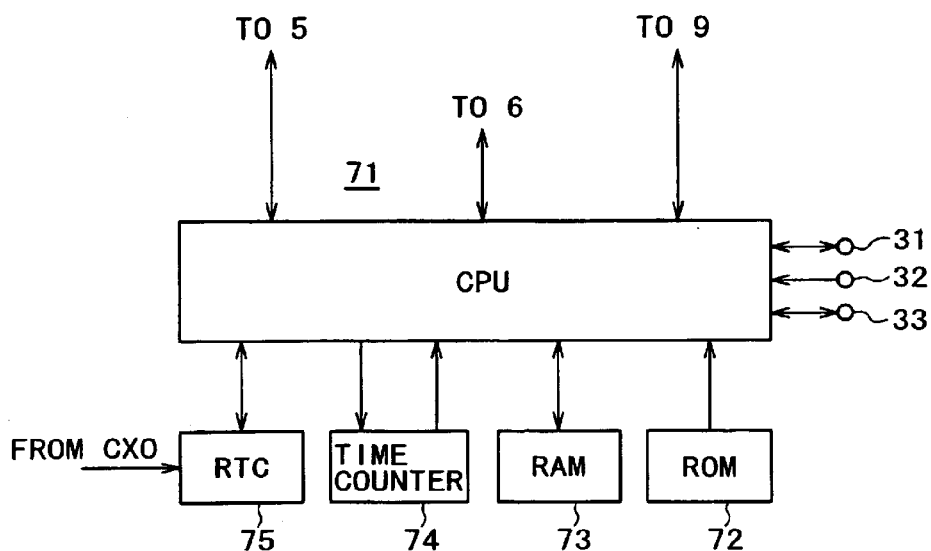
FIG. 23 is a block diagram showing an example of a control section in the GPS receiver shown in FIG. 1.

FIG. 23 diagrams a configuration example of the control section 7. As shown in FIG. 23, the control section comprises a CPU (Central Processing Unit) 71, ROM (Read Only Memory) 72, RAM (Random Access Memory) 73, a time counter 74, and an RTC (Real Time Clock) 75.

The ROM 72 stores various data used for programs and processes executed in the CPU 71. The RAM 73 is mainly used as a work area for temporarily storing intermediate results during various processes. The time counter 74 and the RTC 75 are used for various time detections (time measurements).

As mentioned above, the control section 7 of the GPS receiver according to the embodiment shown in FIG. 1 fast holds the synchronization of the carrier frequency of the received signal and the phase synchronization of the C/A code. Based on the acquisition result, the control section 7 controls the synchronization hold section 6 to instantly incorporate the synchronization of the carrier frequency of the received signal and the phase synchronization of the C/A code. The control section 7 holds the synchronization to obtain bit data as navigation data and performs a positioning operation. The control section 7 can accurately compute the current position and output it via a host I/O terminal 31.

In FIG. 1, the timing generator 8 is supplied with a reference frequency signal from the TCXO 11 and multiplies and divides it to form a clock signal to be supplied to each component. The timing generator 8 supplies the clock signal to each of the components such as the CPU, the synchronization acquisition section 5, the synchronization hold section 6, and the like to enable intended elements of each component to operate.

[About Intermittent Operation]

As shown in FIG. 1, the GPS receiver according to the embodiment uses a power control section 9 controlled by the control section 7 to individually control switches 21, 22, 23, and 24. The switches 21, 22, 23, and 24 correspond to the frequency conversion section 4, the synchronization acquisition section 5, the synchronization hold section 6, and the control section 7, respectively, and turn on or off power supplies provided for these sections.

The GPS receiver according to the embodiment controls power supply to the synchronization hold section 6 configured to be a so-called feedback loop. The GPS receiver intermittently operates the synchronization hold section 6 to decrease the GPS receiver's power consumption.

Figure 31:
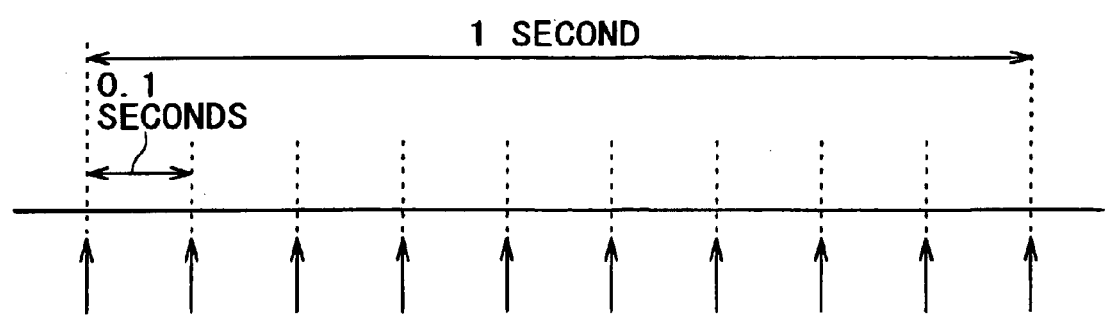
FIG. 31 diagrams timing for measuring a range in a conventional GPS receiver.

The GPS receiver according to the embodiment does not measure a range at a very short cycle such as 100 milliseconds, for example. As shown in FIG. 31, the GPS receiver measures a range every second, i.e., a sufficiently usable time interval, to compute and output positioning information indicating the current position of the GPS receiver. The following describes an intermittent operation of the GPS receiver when the GPS receiver is configured to compute and output every second the positioning information indicating the current position of the GPS receiver.

Pressing a power supply switch for the GPS receiver according to the embodiment turns on the power for the GPS receiver according to the embodiment to supply the power to each component of the GPS receiver. In this case, the power control section 9 turns on the switches 21, 22, and 24. Accordingly, the frequency conversion section 4, the synchronization acquisition section 5, and the control section 7 are also activated.

A high-frequency GPS signal is received from the GPS satellite at the antenna 1. The received signal is supplied to the frequency conversion section 4 via the amplifier 2 and the BPF 3. The frequency conversion section 4 downconverts the signal into an intermediate frequency GPS signal and supplies the signal to the synchronization acquisition section 5 and the synchronization hold section 6.

As mentioned above, the synchronization acquisition section 5 is configured to be a matched filter. Using the FFT, the synchronization acquisition section 5 fast acquires the carrier frequency synchronization and the C/A code phase synchronization. The synchronization acquisition section 5 then supplies the control section 7 with the acquired phase synchronization for the carrier frequency and the C/A code.

Based on the information from the synchronization acquisition section 5, the control section 7 assigns necessary information such as the acquired carrier frequency and C/A code phase synchronization to the synchronization hold section 6. Under control of the control section 7, the power control section 9 forms a switch control signal CT3 that changes the state of the switch 23 from off to on. The power control section 9 supplies this signal to the switch 23 to turn it on. In this manner, the synchronization hold section 6 is supplied with power and operates to fast acquire a GPS signal from the intended GPS satellite and hold that signal.

As mentioned above, the synchronization acquisition section 5 searches for and acquires the phase synchronization for the carrier frequency and the C/A code within a relatively wide range. This acquisition result is used to control the synchronization hold section. The synchronization hold section 6 just needs to searches for the phase synchronization for the carrier frequency and the C/A code within a just limited range, making it possible to very fast acquire the phase synchronization.

There occurs a wait until a match is found between phase synchronizations for the carrier frequency and the C/A code. The wait time for acquisition may vary with a processing speed of the CPU 71 or other conditions. Once the carrier frequency synchronization and the C/A code phase synchronization are acquired, the synchronization hold section 6 holds the synchronization, obtains range data such as a GPS signal transmission time needed for position computation, and supplies this data to the control section 7. At this time, it may be preferable to obtain necessary range data in consideration for a filter to decrease the range unevenness.

When the necessary amount of range data is obtained, the control section 7 controls the power control section 9 to turnoff the switch 23. That is to say, the power control section 9 forms a switch control signal CT3 that changes the state of the switch 23 from on to off. The power control section 9 supplies this signal to the switch 23 to turn it off. This stops supplying the power to the synchronization hold section 6. The synchronization hold section 6 stops operating to decrease the power consumption.

Thereafter, the control section 7 computes a position using the obtained range data. The control section 7 executes a process to allow the GPS receiver to output the computed positioning information that indicates the current position of the GPS receiver. The GPS receiver is configured to output every second the positioning information indicative of the current position of the GPS receiver. If it takes 0.5 seconds to obtain range data needed to compute the positioning information, the synchronization hold section 6 can stop operating during 0.5 seconds after the range data acquisition terminates until the positioning information is computed and is output.

Figure 24:
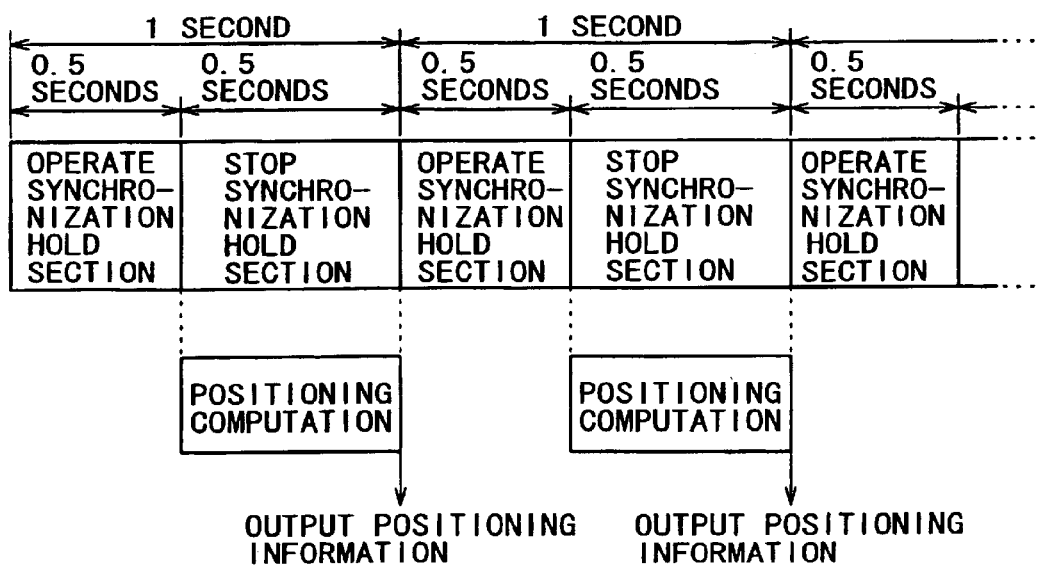
FIG. 24 illustrates an intermittent operation performed in the GPS receiver shown in FIG. 1.

FIG. 24 illustrates active and inactive periods for the synchronization hold section 6 according to this example. As shown in FIG. 24, the synchronization hold section 6 computes and outputs the positioning information indicative of the current GPS receiver position every second. When it takes 0.5 seconds for the synchronization hold section 6 to obtain the range data, the synchronization hold section 6 can stop operating during 0.5 seconds after the range data acquisition until output of the positioning information.

After the positioning information is output, the power is supplied to the inactive synchronization hold section 6 to operate it. After incorporating and holding the synchronization to obtain the range data, the power supply to the synchronization hold section 6 stops. In this manner, the synchronization hold section 6 operates and stops approximately every 0.5 seconds. This makes it possible to shorten the operating time of the synchronization hold section 6 to almost half the constant operating time. It is possible to reduce the power consumption of the GPS receiver for the reduced operating time.

While there has been described the example of intermittently operating only the synchronization hold section 6, the present invention is not limited thereto. For example, it may be preferable to control the start and stop conditions of the frequency conversion section 4 in synchronization with the start and stop conditions of the synchronization hold section 6. When the synchronization hold section 6 is inactive, the GPS signal as a received signal is not processed even if it is supplied to the synchronization hold section 6. While the synchronization hold section 6 stops, stopping operations of the frequency conversion section 4 causes no problem.

While the positioning information is output every second in this example, it may take less than one second after the range data acquisition until the positioning information computation. During that period, it may be preferable to stop supplying the power to overall circuit parts such as the synchronization acquisition section 5 and the control section 7 or stop them to operate. This can further reduce the power consumption.

Figure 25:
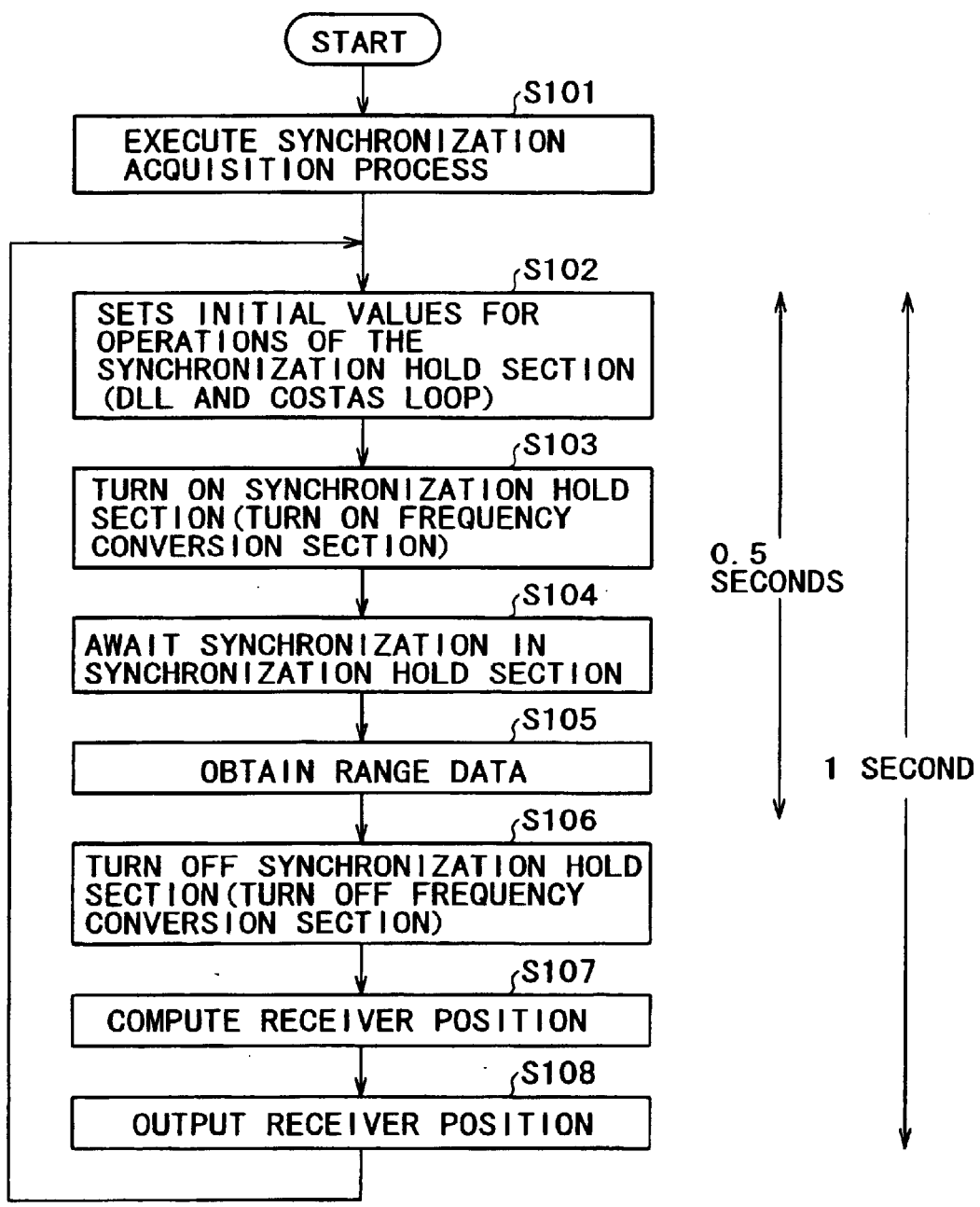
FIG. 25 is a flowchart for showing an intermittent operation performed in the GPS receiver shown in FIG. 1.

The following further describes the above-mentioned intermittent operation especially of the synchronization hold section 6 with reference to a flowchart in FIG. 25. FIG. 25 is the flowchart for describing the intermittent operation of the GPS receiver according to the embodiment. The flowchart provides a process for example when the power is applied to the GPS receiver according to the embodiment.

When the power is applied to the GPS receiver according to the embodiment as shown in FIG. 1, the power is also applied to the parts other than the synchronization hold section 6. The synchronization acquisition section 5 is supplied with IF data from the frequency conversion section 4 and fast executes the synchronization acquisition process to acquire information such as the carrier frequency and the C/A code phase (step S101).

Based on the information such as the carrier frequency and the C/A code phase acquired at step S101, the process sets initial values needed for operations of the synchronization hold section 6 (step S102). In the GPS receiver according to the embodiment, the control section 7 sets initial values for the synchronization hold section 6.

Thereafter, the control section 7 controls the power control section 9 to turn on the switch 23 provided for the synchronization hold section 6 and operate the synchronization hold section 6 (step S103).

This example controls the power-on/off state of the frequency conversion section 4 in synchronization with the power-on/off state of the synchronization hold section 6. However, the frequency conversion section 4 is turned on for synchronization acquisition immediately after the power is supplied. For this reason, the process of turning on the frequency conversion section 4 is omitted from the first process at step S103 to be performed repeatedly.

The second or later process at step S103 turns on the switch 21 provided for the frequency conversion section 4. This allows the inactive frequency conversion section 4 to operate in synchronization with the synchronization acquisition section 6.

After the process at step S103, the synchronization hold section 6 fast performs the synchronization acquisition for the GPS signal based on the information obtained as a result of the acquisition from the synchronization acquisition section 5 initialized by the control section 7. Therefore, the synchronization hold section 6 waits until the synchronization is acquired (step S104). When the synchronization is acquired, the synchronization hold section 6 is ready for holding the synchronization afterward. The synchronization hold section 6 acquires range data needed for computing the range and supplies the range data to the control section 7 (step S105).

After acquiring the range data, the control section controls the power control section 9 to turn off the switch 23 for the synchronization hold section 6 and the switch 21 for the frequency conversion section 4. In this manner, the control section 7 stops operations of the synchronization hold section 6 and the frequency conversion section 4 (step S106).

The control section 7 uses the acquired range data to compute the position of the GPS receiver (step S107). The control section 7 then outputs the computed and obtained information (positioning information) indicating the position of the receiver (step S108). Thereafter, the process at step S102 and later is repeated as shown in FIG. 25.

When the positioning information is output every second, the frequency conversion section 4 and the synchronization hold section 6 need to operate for approximately 0.5 seconds as shown in FIG. 25, for example. The frequency conversion section 4 and the synchronization hold section 6 stop approximately 0.5 seconds after the range data acquisition until the positioning data output. Accordingly, it is possible to reduce the GPS receiver's power consumption without affecting a sequence of positioning process for the GPS receiver.

While the above-mentioned embodiment has described the example of outputting the positioning information every second, the output cycle (output interval) of the positioning information is not limited to one second. The output cycle of the positioning information can be shorter or longer than one second. When the output cycle of the positioning information is increased to two or three seconds, A long cycle for positioning information output increases an error of the initial value to be defined for the synchronization hold section 6. As a result, it takes a long time to acquire the carrier synchronization and the C/A code phase synchronization. To solve this, it is preferable to be able to change an operating time of the synchronization hold section 6 or operating times of the synchronization hold section 6 and the frequency conversion section 4 according to the cycle of positioning information output.

Figure 26A:
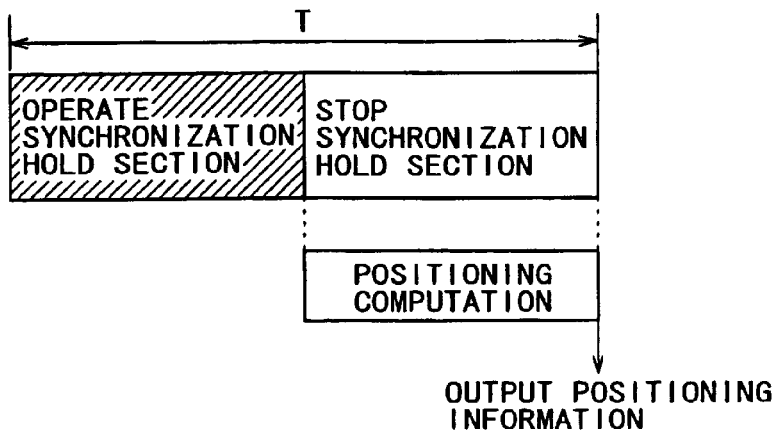
FIGS. 26A through 26C illustrate changing operating times during intermittent operations.
Figure 26B:
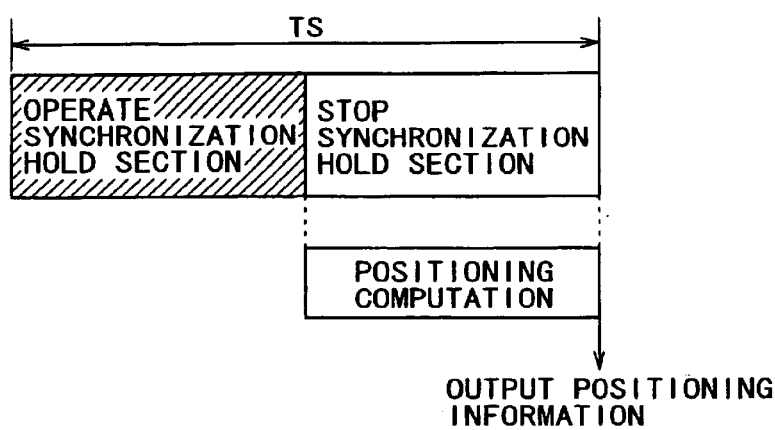
Figure 26C:
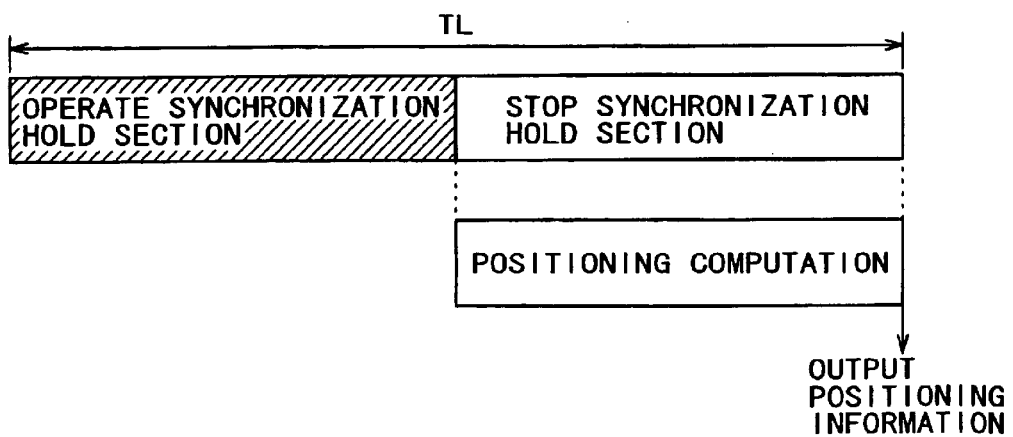
Figure 29:
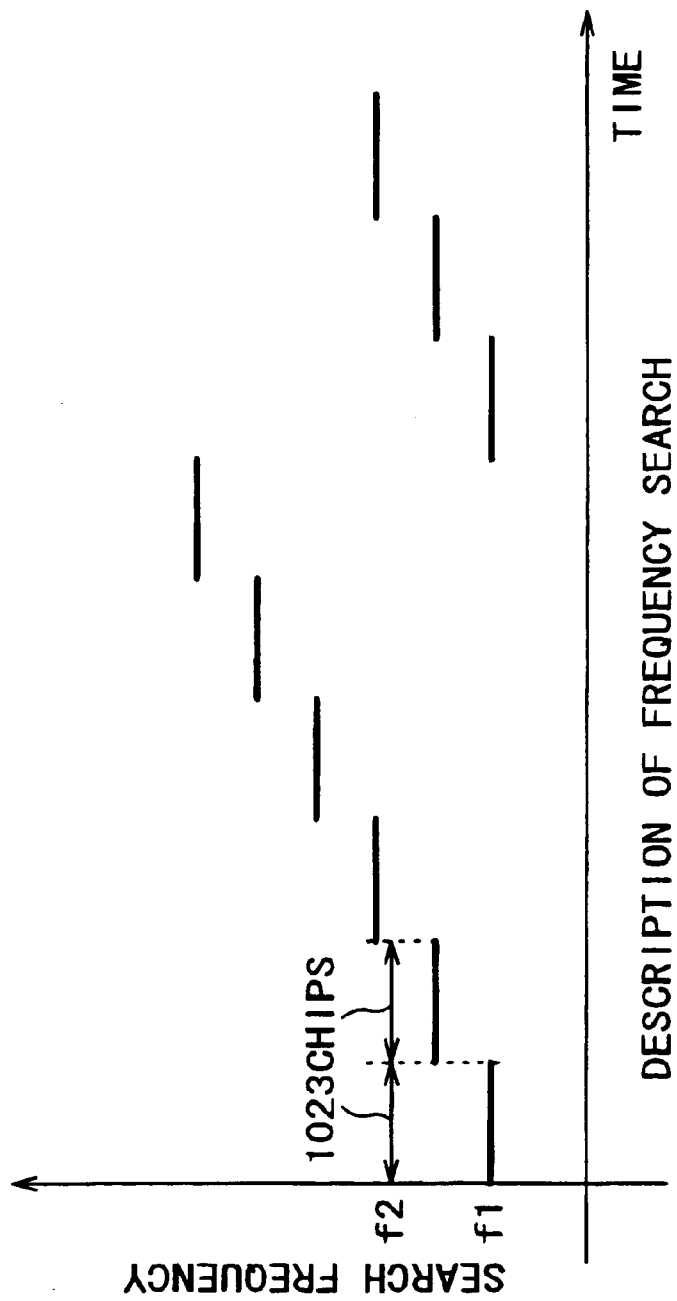
FIG. 29 diagrams a conventional synchronization process for carriers and spread codes.
Figure 30:
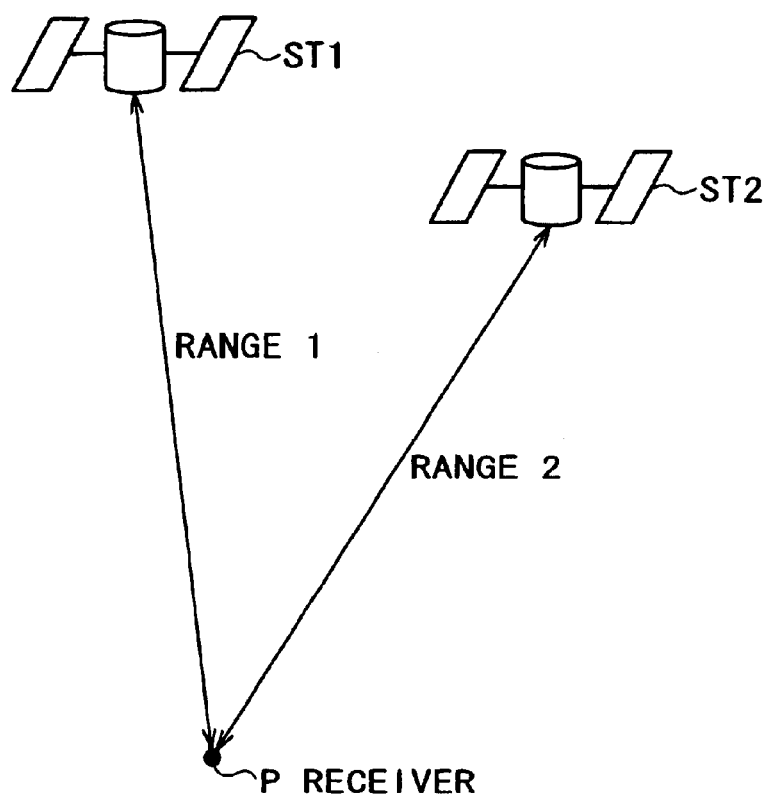
FIG. 30 illustrates ranges used for a positioning operation in the GPS receiver.

FIGS. 26A through 26C show cases of changing the operating time of the synchronization hold section. As shown in FIG. 26A, for example, a standard mode specifies cycle T for positioning information output. It is assumed that approximately time T/2 is required for the process starting from the synchronization incorporation and hold to the range data acquisition. In this case, the synchronization hold section 6 is made to stop at least approximately T/2. During this time, the acquired range data is used for a positioning operation to output the positioning information.

FIG. 26B shows a so-called short mode whose output cycle TS of the positioning information is shorter than the cycle T of the standard mode in FIG. 26A. In the short mode, there is a little possibility of deviating values such as the carrier frequency defined for the synchronization hold section 6 while the synchronization hold section 6 stops. It takes TS/2 or less for the process starting from the synchronization incorporation and hold to the range data acquisition. That is to say, it is considered that, compared to the standard mode, the short mode requires a shorter time for the process starting from the synchronization incorporation and hold to the range data acquisition. In such case, the synchronization hold section 6 should be configured to be able to shorten the operating time.

FIG. 26C shows a so-called long mode whose output cycle TL of the positioning information is longer than the cycle T of the standard mode in FIG. 26A. In the long mode, there is a great possibility of deviating values such as the carrier frequency defined for the synchronization hold section 6 while the synchronization hold section 6 stops. Compared to the standard mode, the long mode requires a longer time for the process starting from the synchronization incorporation and hold to the range data acquisition. In such case, the synchronization hold section 6 should be configured to be able to extend the operating time.

In the long mode as shown in FIG. 26C, let us suppose that it is possible to shorten the time TL/2 required for the process starting from the synchronization incorporation and hold to the range data acquisition. In such case, it is possible to ensure a longer time to stop the synchronization hold section 6, increasing the possibility of energy saving.

It is possible to change the operating time of the synchronization hold section 6 by providing control to turn on or off the switch 23 in FIG. 1. That is to say, extending the on-state of the switch 23 extends the operating time of the synchronization hold section 6. By contrast, shortening the on-state of the switch 23 shortens the operating time of the synchronization hold section 6.

Further, it is possible to vary the time to stop the synchronization hold section 6 according to the time to operate the synchronization hold section 6. It is also possible to permanently specify the time to stop the synchronization hold section 6 as the time needed for the positioning operation.

As mentioned above, a long cycle for positioning information output deviates values such as the carrier frequency used for the synchronization hold section 6, consuming the time for the synchronization incorporation. Likewise, even if the positioning information is output at a short cycle, providing the GPS receiver with much acceleration moves the GPS receiver largely in a short time. As the synchronization hold section 6 makes the synchronization incorporation difficult, there is possibility of deviating values such as the carrier frequency used for the synchronization hold section 6.

Let us consider the case where the positioning information is output at a long cycle or the acceleration of the GPS receiver exceeds a specified value. In such case, it may be preferable to estimate specified values such as the carrier frequency used for the synchronization hold section 6 from the GPS satellite's orbit information, position information, speed data, time data, and the like so far acquired by the control section 7. These pieces of information may be reassigned to the synchronization hold section 6 and then start it.

This method can prevent the necessity of too long a time for the synchronization incorporation in the synchronization hold section 6. It is possible to reduce the power consumption of the GPS receiver.

There may be a case where the operating time of the synchronization hold section 6 is changed in accordance with the output cycle of positioning data. In this case, the control section 7 may estimate an initial value such as the carrier frequency and the operating time to be assigned to the synchronization hold section 6. The estimated values may be used to start or stop operations for control. The control section 7 can use the information such as the output cycle of the positioning information, orbit information, position information, speed data, time data, and the like for estimation.

While the above-mentioned embodiment has described intermittent operations of the synchronization hold section 6 or of the synchronization hold section 6 and the frequency conversion section 4, the present invention is not limited thereto. As shown in the flowchart of FIG. 25, for example, the synchronization acquisition section 5 fast executes the synchronization acquisition for GPS signals only immediately after the power-on sequence and is not used thereafter.

After the process at step S101 in FIG. 25, it may be preferable to turn off the switch 22 for the synchronization acquisition section to stop its operation. Instead of allowing the control section 7 to estimate the information such as the carrier frequency to be defined for the synchronization hold section 6 as mentioned above, it may be preferable to operate the synchronization acquisition section as needed to acquire the carrier frequency synchronization and the C/A code phase synchronization. The result may be defined for the synchronization hold section 6.

Therefore, it may be preferable to control the power-on/off state of the synchronization acquisition section 5 in synchronization with the power-on/off state of the synchronization hold section 6. Further, it may be preferable to turn on or off the synchronization acquisition section 5 at a relatively long cycle that requires the accurate synchronization acquisition of the carrier frequency and the C/A code phase by performing the synchronization acquisition. That is to say, the synchronization acquisition section 5 may be turned on or off at a longer cycle than the control of turning on or off the synchronization hold section 6.

It is also possible to configure a GPS receiver not having the synchronization acquisition section 5 capable of high-speed synchronization acquisition. In this case, it is possible to save the power consumption of the GPS receiver by intermittently operating the synchronization hold section or the synchronization hold section and the frequency conversion section. That is to say, the present invention can be applied to the GPS receiver that performs the synchronization acquisition and holding feature comprising the Costas loop and the DLL.

The synchronization hold section is not limited to the configuration comprising the Costas loop and the DLL. Of course, the synchronization hold section may comprise a circuit capable of acquiring and holding the carrier frequency synchronization and the C/A code phase synchronization, demodulating and extracting transmission data by means of another method.

While the above-mentioned embodiment performs intermittent operations by controlling the power supply to each block of the GPS receiver, the present invention is not limited thereto. Instead of controlling the power supply, for example, it may be preferable to stop supplying a clock signal to stop processing an intended block for power consumption saving.

As mentioned above, the present invention can reduce the power consumption of the GPS receiver, for example, even if the positioning information is output continuously at a specified cycle.

It may be preferable to be able to change operating times for the synchronization hold section and the like. In this case, it is possible to change the degree of GPS receiver's power consumption and efficiently decrease the GPS receiver's power consumption without degrading the GPS receiver performance such as the positioning sensitivity and the positioning speed.

If the synchronization hold section or the other sections are operated intermittently, it is possible to efficiently obtain navigation data provided from the GPS signal.

An intermittent operation is performed after the necessary navigation data is acquired. After the stop, the operation does not restart with no navigation data obtained. It becomes possible to fast acquire and hold the synchronization and obtain the range data using the already obtained data.

What is claimed is:

1. A GPS receiver comprising:
a frequency conversion means for converting a high-frequency GPS signal into an intermediate frequency GPS signal, wherein the high-frequency GPS signal is transmitted as transmission data from an artificial satellite by modulating a carrier wave through a signal spectrum-spread by a spread code;
a synchronization hold means for obtaining the transmission data by receiving the intermediate frequency GPS signal supplied from the frequency conversion means and acquiring and holding synchronization of the carrier wave and phase synchronization of the spread code;
a control means for controlling repetition of an intermittent operation which operates the synchronization hold means to obtain the transmission data, then stops operating the synchronization hold means, and again operates the synchronization hold means after lapse of a specified time by using, as initial values, a carrier wave frequency and a spread code phase valid for the most recent stop condition; and a positioning operation means for performing a positioning operation by using the transmission data obtained through the synchronization hold means and finding and outputting positioning information indicative of a current position.

2. The GPS receiver according to claim 1, wherein the control means is configured to be able to change an operating time of the synchronization hold means in accordance with an output cycle of the positioning information.

3. The GPS receiver according to claim 1 comprising:

an initial value estimation means for estimating the carrier wave frequency and the spread code phase used as the initial values based on the already obtained transmission data, wherein the control means can control the synchronization hold means by using the carrier wave frequency and the spread code phase as the initial values estimated in the initial value estimation means.

4. The GPS receiver according to claim 2 comprising:

an initial value estimation means for estimating the carrier wave frequency and the spread code phase used as the initial values in accordance with an output cycle of the positioning information by using the already obtained transmission data; and an operating time estimation means for estimating an operating time for the synchronization hold means in accordance with an output cycle of the positioning information, wherein the control means controls the synchronization hold means based on the carrier wave frequency and the spread code phase estimated in the initial value estimation means and based on the estimated operating time estimated in the operating time estimation means.

5. The GPS receiver according to claim 1, wherein the control means controls start and stop conditions of the frequency conversion means in synchronization with stop conditions of the synchronization hold means.

6. The GPS receiver according to claim 1, wherein the synchronization hold means comprises a Costas loop section to acquire and hold synchronization of the carrier wave and a delay lock loop section to acquire and hold phase synchronization of the spread code.

7. The GPS receiver according to claim 1 having:

a synchronization acquisition means for fast acquiring synchronization of the carrier wave and phase synchronization of the spread code and outputting the acquired carrier wave frequency and spread code phase, wherein the control means provides control so as to operate the synchronization hold means at least after a power-on sequence by using, as the initial values, the carrier wave frequency and the spread code phase from the synchronization acquisition means, operate the synchronization hold means, and then repeatedly start and stop the synchronization acquisition means at a cycle longer than or equal to that for the synchronization hold means.

8. A GPS signal reception method comprising the steps of:

sequentially converting frequencies of a high-frequency GPS signal transmitted as transmission data from an artificial satellite by modulating a carrier wave through a signal spectrum-spread by a spread code to form an intermediate frequency GPS signal;

obtaining the transmission data by performing a synchronization hold process for the intermediate frequency GPS signal so as to acquire and hold synchronization of the carrier wave and phase synchronization of the spread code;

using, as initial values, a carrier wave frequency and a spread code phase valid for the most recent stop condition of the synchronization hold process to repeat an intermittent operation which temporarily stops the synchronization hold process after obtaining the transmission data and restarts the synchronization hold process after lapse of a specified time; and using the obtained transmission data to perform a positioning operation and finding and outputting positioning information indicative of a current position.

9. The GPS signal reception method according to claim 8, further comprising the steps of:

change an operating time of the synchronization hold process in accordance with an output cycle of the positioning information.

10. The GPS signal reception method according to claim 8, further comprising the steps of:

estimating the carrier wave frequency and the spread code phase used as the initial values based on the already obtained transmission data; and using the estimated carrier wave frequency and spread code phase as the initial values to restart the temporarily stopped synchronization hold process.

11. The GPS signal reception method according to claim 9, further comprising the steps of:

estimating the carrier wave frequency and the spread code phase used as the initial values in accordance with an output cycle of the positioning information by using the already obtained transmission data;

estimating an operating time for the synchronization hold process in accordance with an output cycle of the positioning information; and using the estimated carrier wave frequency and spread code phase as the initial values and the estimated operating time to restart the temporarily stopped synchronization hold process.

12. The GPS signal reception method according to claim 8, further comprising the steps of:

controlling start and stop conditions of the frequency conversion process in synchronization with start and stop conditions of the synchronization hold process.

13. The GPS signal reception method according to claim 8, wherein the synchronization hold process concurrently holds synchronization of the carrier wave using a Costas loop section and holds phase synchronization of the spread code using a delay lock loop section.

14. The GPS signal reception method according to claim 8, further comprising the steps of:

performing a synchronization acquisition process to fast acquire synchronization of the carrier wave and phase synchronization of the spread code and to output the acquired carrier wave frequency and spread code phase, and executing the synchronization hold process at least after a power-on sequence by using, as the initial values, the carrier wave frequency and the spread code phase obtained by executing the synchronization acquisition process and, after execution of the synchronization hold process, repeatedly starting and stopping the synchronization acquisition process at a cycle longer than or equal to that for the synchronization hold process.

* * * * *